(12) United States Patent
Horigome et al.

(10) Patent No.: US 10,718,713 B2
(45) Date of Patent: Jul. 21, 2020

(54) UNKNOWN SAMPLE DETERMINING METHOD, UNKNOWN SAMPLE DETERMINING INSTRUMENT, AND UNKNOWN SAMPLE DETERMINING PROGRAM

(71) Applicant: Hitachi High-Tech Science Corporation, Minato-ku, Tokyo (JP)

(72) Inventors: Jun Horigome, Tokyo (JP); Koichi Nakamura, Tokyo (JP); Yoichi Sato, Tokyo (JP); Yusuke Hosen, Tokyo (JP); Michinari Kozuma, Tokyo (JP)

(73) Assignee: Hitachi High-Tech Science Corporation, Minato-ku, Tokyo (JP)

( * ) Notice: Subject to any disclaimer, the term of this patent is extended or adjusted under 35 U.S.C. 154(b) by 169 days.

(21) Appl. No.: 15/696,392

(22) Filed: Sep. 6, 2017

(65) Prior Publication Data

US 2018/0067048 A1 Mar. 8, 2018

(30) Foreign Application Priority Data

Sep. 6, 2016 (JP) .................. 2016-186207

(51) Int. Cl.
*G01N 21/64* (2006.01)
*G01N 3/00* (2006.01)
(Continued)

(52) U.S. Cl.
CPC .......... *G01N 21/645* (2013.01); *G01J 1/0219* (2013.01); *G01J 3/00* (2013.01);
(Continued)

(58) Field of Classification Search
CPC .... G01J 1/02; G01J 1/0219; G01J 3/00; G01J 3/02; G01J 3/44; G01J 3/0264;
(Continued)

(56) References Cited

U.S. PATENT DOCUMENTS

2003/0215791 A1* 11/2003 Garini ............... B82Y 5/00
435/5
2004/0007675 A1* 1/2004 Gillispie ............ G01J 3/4406
250/458.1

(Continued)

FOREIGN PATENT DOCUMENTS

JP WO 2013/190618 A1 * 12/2013
JP 5856741 B2 2/2016
(Continued)

OTHER PUBLICATIONS

"Foods and Tableware," 2013, vol. 54, No. 5, pp. 1-66.
(Continued)

*Primary Examiner* — Gregory J Toatley, Jr.
*Assistant Examiner* — Lynda Dinh
(74) *Attorney, Agent, or Firm* — Banner & Witcoff, Ltd.

(57) ABSTRACT

In a standard process for determining an unknown sample, fluorescent substances are determined from respective fluorescence characteristics and model coefficients are calculated from spectrum ranges of the fluorescence characteristics of the determined fluorescent substances. An unknown sample is measured after reading of the model coefficients, whereby a target value of the unknown sample is obtained.

11 Claims, 19 Drawing Sheets

(51) Int. Cl.
- *G01J 3/00* (2006.01)
- *G01J 1/02* (2006.01)
- *G01J 3/02* (2006.01)
- *G01J 3/44* (2006.01)
- *G01N 21/27* (2006.01)
- *G01J 3/28* (2006.01)

(52) U.S. Cl.
CPC .......... *G01J 3/0264* (2013.01); *G01J 3/4406* (2013.01); *G01N 21/64* (2013.01); *G01J 2003/283* (2013.01); *G01N 21/276* (2013.01); *G01N 21/6486* (2013.01); *G01N 2021/6417* (2013.01); *G01N 2021/6419* (2013.01); *G01N 2021/6421* (2013.01); *G01N 2201/12* (2013.01)

(58) Field of Classification Search
CPC .. G01J 3/4406; G01J 2003/283; G01N 21/64; G01N 21/645; G01N 21/276; G01N 21/6486; G01N 2021/6417; G01N 2021/6419; G01N 2021/6421; G01N 2021/12

See application file for complete search history.

(56) References Cited

U.S. PATENT DOCUMENTS

| | | | | |
|---|---|---|---|---|
| 2010/0304421 | A1* | 12/2010 | Piletsky | G01N 21/6428 435/29 |
| 2013/0284945 | A1* | 10/2013 | Aitkenhead | G01N 21/6486 250/459.1 |
| 2014/0190243 | A1* | 7/2014 | Gunji | G01N 30/74 73/61.55 |
| 2015/0083903 | A1* | 3/2015 | Gilmore | G01N 21/645 250/252.1 |

FOREIGN PATENT DOCUMENTS

| | | |
|---|---|---|
| JP | 2016-045179 A | 4/2016 |
| WO | 2012/074413 A1 | 6/2012 |

OTHER PUBLICATIONS

Sugiyama, J., Fujita, K., "Detection of Food Safety Using Fluorescence Fingerprint," Scientific Instrument News, 2014, vol. 5, pp. 1-6.

Jan. 17, 2018—(EP) Extended Search Report—App 17189696.2.

Gamal Elmasry et al: "Non-invasive sensing of freshness indices of frozen fish and fillets using pretreated excitation-emission matrices", Sensors and Actuators B: Chemical: International Journal Devoted to Research and Development of Physical and Chemical Transducers?vol. 228?Jan. 12, 2016 (Jan. 12, 2016)?pp. 237-250, XP055438914A.

Lu F et al: "Dissolved organic matter with multi-peak fluorophores in landfill leachate" Chemosphere, Pergamon Press?Oxford?GB? vol. 74?No. 4?Nov. 4, 2009 (Nov. 4, 2009)? pp. 575-582, XP025846496A.

The Hitachi Scientific Instrument News, 2015, vol. 58, No. 1, pp. 4982-4988 [see corresponding English language article, Jun Horigome, Introduction of Food Distinction Technology by Fluorescence Fingerprint Measurement with F-7000, Hitachi Scientific Instrument News, Sep. 2015, vol. 6, pp. 60-67].

* cited by examiner

FIG. 3A

| FIG3 |
|---|
| FIG3A | FIG3B |
| FIG3C | FIG3D |

CANDIDATE FLUORESCENT SUBSTANCE: SUBSTANCE A
↓
PEAK SELECTION STEP
- FIRST PEAK OR PEAK WAVELENGTH RANGES AND ALLOWABLE WAVELENGTH RANGES (λexp ± xx nm, λexp ± yy nm)
- NORMALIZATION
↓ DETERMINATION
SPECTRUM RANGE SELECTION STEP
- CONTOUR LINE DETERMINATION VALUES (50, 25, 10, ···)
- DETERMINATION WAVELENGTH RANGE (±zz nm)
- ELIMINATION OF SCATTERED LIGHT AND HIGH-ORDER LIGHT (SETTING OF ELIMINATION WAVELENGTH RANGES)
- PROXIMATE PEAKS DETERMINATION PROCESSING
↓ DETERMINATION
SUB PEAK SETTING STEP
- NUMBER OF SUB PEAKS
- SUB PEAK WAVELENGTHS
- SUB PEAK RATIOS
- THRESHOLD VALUE CANDIDATE FLUORESCENT SUBSTANCE: SUBSTANCE B
↓
PEAK SELECTION STEP
- FIRST PEAK OR PEAK WAVELENGTH RANGES AND ALLOWABLE WAVELENGTH RANGES (λexp ± xx nm, λexp ± yy nm)
- NORMALIZATION
↓ DETERMINATION
SPECTRUM RANGE SELECTION STEP
- CONTOUR LINE DETERMINATION VALUES (50, 25, 10, ···)
- DETERMINATION WAVELENGTH RANGE (±zz nm)
- ELIMINATION OF SCATTERED LIGHT AND HIGH-ORDER LIGHT (SETTING OF ELIMINATION WAVELENGTH RANGES)
- PROXIMATE PEAKS DETERMINATION PROCESSING
↓ DETERMINATION
SUB PEAK SETTING STEP
- NUMBER OF SUB PEAKS
- SUB PEAK WAVELENGTHS
- SUB PEAK RATIOS
- THRESHOLD VALUE

| NO. | CANDIDATE SUBSTANCE NAME | PEAK WAVELENGTHS | SPECTRUM RANGE-50 | NUMBERS OF PEAKS |
|---|---|---|---|---|
| 1 | LACTOFLAVIN | 470/675 | EX:440-670, EM:630-770 | EX: 2, EM: 1 |
| 2 | LIPOPEROXIDE | 350/495 | EX:340-670, EM:450-550 | EX: 1, EM: 1 |
| 3 | VITAMIN E | 295/310 | EX:270-310, EM:290-350 | EX: 1, EM: 1 |

FIG. 13A

| NO. | PEAK WA-VELENGTHS | SPECTRUM RANGE-50 | SPECTRUM RANGE-10 | NUMBER OF PEAKS | PEAK RATIOS | PEAK WAVELEN-GTHS EX | PEAK WAVELEN-GTHS EM |
|---|---|---|---|---|---|---|---|
| NO. 1 | 410/675 | 340-670 680-730 | 300-680 650-780 | EX: 6 EM: 2 | EX:12,100, 17, 15, 13, 85 EM:100, 15 | EX: 320 410 505 535 610 670 | EX: 675 725 |
| SEARCH ALLOWABLE RANGE | ±5nm | ±10nm | ±10nm | ±1 | ±5 | ±10nm | ±10nm |

FIG. 13B

| CANDIDATE FLUORESCENT SUBSTANCE NAME | PEAK WAVELENGTHS | SPECTRUM RANGE-50 | SPECTRUM RANGE-10 | NUMBER OF PEAKS | PEAK RATIOS | PEAK WAVELENGTHS EX | PEAK WAVELENGTHS EM |
|---|---|---|---|---|---|---|---|
| CHLOROPHYLL a | 410/675 | 340-675<br>680-750 | 300-6805<br>650-785 | EX: 6<br>EM: 2 | EX: 12, 100, 17, 15, 13, 85<br>EM: 100, 15 | EX:<br>320<br>410<br>505<br>535<br>610<br>670 | EX:<br>675<br>725 |

FIG. 14

| NO. / CANDIDATE FLUORESCENT SUBSTANCE NAME | PEAK WAVELENGTHS | SPECTRUM RANGE 50 | SPECTRUM RANGE 10 | NUMBER OF PEAKS | PEAK RATIOS | PEAK WAVELENGTHS EX | PEAK WAVELENGTHS EM |
|---|---|---|---|---|---|---|---|
| NO. 1 (P1) / CHLOROPHYLL a | 410/675 | 340-670 680-730 | 300-680 650-780 | EX: 6 EM: 2 | EX: 12, 100, 17, 15, 13, 85 EM: 100, 15 | EX: 320 410 505 535 610 670 | EX: 675 725 |
| NO. 2 (P2) / LIPOPEROXIDE | 350/495 | 340-670 450-550 | 280-390 410-600 | EX: 1 EM: 1 | EX: 100 EM: 100 | EX: 350 | EX: 675 |
| NO. 3 (P3) / VITAMIN E | 295/310 | 270-310 290-350 | 250-330 280-390 | EX: 1 EM: 1 | EX: 100 EM: 100 | EX: 295 | EX: 310 |

FIG. 15

| CANDIDATE SAMPLE NAME | NUMBER OF FLUORESCENT SUBSTANCES (FIRST PEAKS) | PEAK RATIOS | SPECTRUM RANGE-10 (P1) | SPECTRUM RANGE-10 (P2) | SPECTRUM RANGE-10 (P3) |
|---|---|---|---|---|---|
| OLIVE OIL (EXTRA VIRGIN) | 3 | 100, 5, 30 | 300-680 650-780 | 280-390 410-600 | 250-330 280-390 |

UNKNOWN SAMPLE DETERMINING METHOD, UNKNOWN SAMPLE DETERMINING INSTRUMENT, AND UNKNOWN SAMPLE DETERMINING PROGRAM

CROSS-REFERENCE TO RELATED APPLICATION

This application claims priority from Japanese Patent Application No. 2016-186207, filed on Sep. 6, 2016, the entire subject matters of which is incorporated herein by reference.

BACKGROUND

1. Field of the Invention

The present disclosure relates to a method, an instrument, and a program for acquiring a three-dimensional (3D) spectrum of the excitation wavelength, the fluorescence wavelength, and the fluorescence intensity and determining an unknown sample based on the acquired fluorescence characteristic.

2. Background Art

Conventionally, the mainstream of fluorescence measurements is to measure a two-dimensional excitation-fluorescence spectrum in which fluorescence intensity values are plotted with respect to the excitation wavelength or the fluorescence wavelength. And a quantitative analysis is performed using a standard curve with respect to the fluorescence intensity that is obtained at a single pair of an excitation wavelength and a fluorescence wavelength using a standard having a known density.

Although a 3D fluorescence spectrum having the excitation wavelength, the fluorescence wavelength, and the fluorescence intensity as variables is also used, its use in many cases remains in recognition of a fluorescence characteristic of a sample. In recent years, the increase in scanning rate has made it possible to acquire a 3D fluorescence spectrum in a short time and applications have spread that perform sample identification and a density analysis by performing a multivariate analysis on plural 3D fluorescence spectrum data using such a technique as a principal component analysis, a discriminant analysis, or a PLS regression analysis.

Since a 3D fluorescence spectrum has a much larger data points than a 2D fluorescence spectrum, there is a report in which differences between samples or a density is calculated by performing a multivariate analysis (see, for example, Non-patent document 1). To perform a multivariate analysis, 3D fluorescence spectra of plural samples are acquired and converted into a data matrix, which is read into multivariate analysis software.

[Non-Patent Document-1] "Foods and Tableware," 2013, Vol. 54, No. 5

When a success/failure determination is made by a principal component analysis or a discriminant analysis, it is determined what wavelength makes a large contribution statistically based on a plot of factor loadings and an F value contribution factor (statistical quantities of a multivariate analysis).

In JP-A-2016-045179, a PLS regression formula is determined using, as known teacher data, measurement values of a chemical analysis on free amino acid, free fatty acid, or the like (target variable) and 3D fluorescence spectrum data (explanatory variable) and a target value of an unknown sample is obtained using the determined PLS regression formula.

The PLS regression analysis is an analyzing method for obtaining a quantitative value of a target substance. As described in JP-B-5856741, a peak in a 3D fluorescence spectrum can be identified as long as a fluorescence wavelength of a compound that emits measurement target fluorescence. However, a measurement target such as a food, a chemical material, or an environmental substance in many cases contains plural fluorescent substances, in which case compounds other than a target compound for which a quantitative value is to be obtained emit fluorescence. As a result, in a multivariate analysis using a 3D fluorescence spectrum, a final target value is obtained by extracting characteristics of plural fluorescent substances at pairs of an excitation wavelength and a fluorescence wavelength. There may occur a case that an unknown fluorescence wavelength contributes to a model, in which case it cannot be determined to what fluorescent substances 3D fluorescence spectrum data of the model are attributed. The model is a combination of the wavelengths and the coefficients.

Although correlation is found between calculation values of a PLS regression formula of a 3D fluorescence spectrum and measurement values of a chemical analysis, there is no disclosure as to what pairs of wavelengths of 3D fluorescence spectrum data contribute to an analysis or to what fluorescent substances those pairs of wavelengths correspond.

From the statistical point of view, since 3D fluorescence spectrum data are handled as a data matrix of number sequences, it is not considered important fluorescence of what fluorescent substance each pair of wavelengths used in an analysis corresponds to. Where teacher data such as a production area or success/failure is used as a target value as in a discriminant analysis disclosed in JP-B-5856741, a target value of an unknown sample can be obtained by a multivariate analysis even if fluorescent substances to which fluorescence emitted from a measurement target are not identified. This is an advantage that a solution can be obtained even without knowledge about a fluorescence spectrum (or an analysis). However, from the chemical point of view, it is important to calculate quantitative values with identification of fluorescent substances from their fluorescence characteristics.

At present, to identify substances to which a fluorescence spectrum is attributed, a method of studying document data of scientific documents etc. and spectrum that are available on web pages. However, these data cannot be used for the purpose as a 3D fluorescence spectrum because they are mainly 2D fluorescence spectrum data, that is, excitation spectrum data or fluorescence spectrum data.

As disclosed in JP-B-5856741 and in JP-A-2016-045179, in data preprocessing to be performed in generating a model for estimation, the analysis accuracy is increased by eliminating noise such as scattered light, second-order light, and third-order light. In the case of a sample whose fluorescence characteristic is known such as aflatoxin which is referred to in JP-B-5856741, data in an excitation wavelength range and a fluorescence wavelength range of a 3D fluorescence spectrum that represents the features of aflatoxin contained in a measurement target are mainly extracted. That is, to shorten the analysis time and increase the accuracy, it is important to eliminate data of part of a 3D fluorescence spectrum being in such wavelength ranges as to be unnecessary for an analysis and to extract only data of part of a 3D fluorescence spectrum being in such wavelength ranges as to be necessary for the analysis. In this respect, although data of characteristic 3D fluorescence spectra can be extracted easily if fluorescence wavelengths are known, in actuality irrelevant substances exist. Thus, to determine whether to eliminate an unknown peak, it is important to identify a fluorescent substance to which the unknown peak is attributed.

To analyze what pairs of wavelengths of a 3D fluorescence spectrum contribute to a determination and to what fluorescent substances they are attributed, it is necessary to identify fluorescent substances to which respective peaks appearing in a 3D fluorescence spectrum are attributed. To identify fluorescent substances, it is indispensable to recognize physical and material properties of a measurement target sample to some extent. It is difficult to identify fluorescent substances if properties of a measurement target sample are not known.

A sample without such property information can be determined by sequentially identifying fluorescent substances to which respective fluorescence characteristic-indicative fluorescence spectrum peaks are attributed. It is necessary to determine a spectrum range and sub peaks that indicate a fluorescence characteristic based on a peak of attention of a measured 3D fluorescence spectrum and to determine a fluorescent substance by comparing an excitation wavelength and a fluorescence wavelength of the peak of attention and the determined spectrum range and sub peaks with a known fluorescent substance library. It is further necessary to set an effective spectrum range and perform a multivariate analysis. By performing, as a series of operations, steps from acquisition of a 3D fluorescence spectrum to determination of a result, the efficiency of an analysis involving complex steps such as management of sample data, generation of a model using multivariate analysis software, and calculation of a multivariate analysis solution of an unknown sample can be increased.

SUMMARY

According to an exemplary embodiment of the present disclosure, there is provided an unknown sample determining method of determining an unknown sample by calculating model coefficients by extracting a fluorescence characteristic from results of measurements of 3D fluorescence spectra of standards, the method comprising:
a standard process of performing measurements on standards, including:
a measurement conditions setting step of setting measurement conditions under which to measure 3D fluorescence spectra of the standards;
a standard table registering step of registering, in a standard table, the standards in the form of combinations of at least a sample name, determination information, and density information;
a 3D fluorescence spectrum measuring step of measuring 3D fluorescence spectra of the standards registered in the standard table under the conditions set at the measurement conditions setting step;
a candidate fluorescent substance determining step of determining candidate fluorescent substances contained in each of the standards by extracting a fluorescence characteristic from the 3D fluorescence spectrum of the standard and comparing the extracted fluorescence characteristic with fluorescence characteristics registered in a candidate fluorescent substance library;
a peak selection step of extracting first peaks representing parts of the fluorescence characteristic from the 3D fluorescence spectrum of each of the standards obtained at the 3D fluorescence spectrum measuring step, and normalizing the first peak;
a spectrum range selection step of setting spectrum ranges corresponding to a fluorescence intensity contour line determination value;
a sub peak selection step of selecting sub peaks in each of the spectrum ranges set at the spectrum range selection step; and
a model coefficients output step of calculating model coefficients by performing a multivariate analysis based on the set first peaks, spectrum ranges, and sub peaks;
a sample process of performing a measurement on an unknown sample, including:
a model coefficients reading step of reading the model coefficients that were output from the standard process;
a measurement conditions setting step of setting conditions under which to measure a 3D fluorescence spectrum of the unknown sample;
a measurement conditions determining step of determining whether the measurement conditions set at the measurement conditions setting step are equivalent to the conditions set at the measurement conditions determining step of the standard process or include a spectrum range of a fluorescence characteristic; a sample table setting step of setting, as a sample table, a sample name of the unknown sample and a determination condition;
a 3D fluorescence spectrum measuring step of performing a measurement on the unknown sample under the conditions set at the measurement conditions setting step;
a candidate fluorescent substance determining step of determining candidate fluorescent substances that match the read-in model coefficients based on a fluorescence characteristic of a 3D fluorescence spectrum obtained at the 3D fluorescence spectrum measuring step; and
a candidate sample extracting step of extracting a candidate sample by collating a combination of the candidate fluorescent substances determined at the candidate fluorescent substance determining step with a candidate sample library;
a candidate fluorescent substance display step of displaying a list of names of the extracted candidate fluorescent substances and the fluorescence characteristic used for the determination of the candidate fluorescent substances; and
a candidate sample display step of displaying a name of the extracted candidate sample together with fluorescence characteristics of the respective candidate fluorescent substances.

According to another exemplary embodiment of the present disclosure, there is provided an unknown sample determining instrument which is a fluorescence spectrophotometer including a photometer unit, a computer unit, and an interface unit,
wherein the photometer unit performs:
measuring a 3D fluorescence spectrum in the form of a fluorescence intensity contour diagram by measuring a fluorescence spectrum by shining excitation light emitted from an excitation-side spectroscope set at a fixed wavelength on a measurement sample while wavelength-scanning a fluorescence-side spectroscope;
returning the fluorescence wavelength to a start wavelength upon completion of the measurement of the fluorescence spectrum;
measuring a fluorescence spectrum at a next excitation wavelength by changing the excitation wavelength by a prescribed interval;
storing measured fluorescence spectra in three dimensions of the excitation wavelength, the fluorescence wavelength, and the fluorescence intensity; and
performing the preceding operations until the excitation wavelength reaches a final wavelength,
wherein the computer unit includes and a controller that controls the photometer unit and a data processing unit, and
wherein the interface unit includes a monitor and an operating panel,
wherein the data processing unit executes a standard process of performing measurements on standards and a sample process of performing a measurement on an unknown sample;
that in the standard process, the data processing unit
measures 3D fluorescence spectra of the standards registered in a standard table according to set measurement conditions; and
performs a candidate fluorescent substance determining process of determining candidate fluorescent substances based on a fluorescence characteristic of each of the measured 3D fluorescence spectra, the candidate fluorescent substance determining process including:
setting, in the 3D fluorescence spectrum in which measured fluorescence intensity values are expressed by contour lines, first peaks having large fluorescence intensity values, spectrum ranges corresponding to a contour line determination value, and sets of sub peaks located at the same fluorescence wavelengths as the first peaks, respectively;
excluding data that are out of the set spectrum ranges from 3D fluorescence spectrum data to be subjected to a multivariate analysis and employing only data in the set spectrum ranges as the 3D fluorescence spectrum data to be subjected to the multivariate analysis;
calculating model coefficients by performing the multivariate analysis and storing the calculated model coefficients; and
that in the sample process, the data processing unit
reads the model coefficients;
determines whether spectrum ranges used in calculating the model coefficients are included in spectrum ranges of input unknown sample measurement conditions;
determines whether at least a wavelength scanning rate, an excitation-side slit width, a fluorescence-side slit width, a response setting value, and a detector voltage of the input unknown sample measurement conditions are the same as those of the standard measurement conditions;
if affirmative determinations are made, performs a candidate fluorescent substance determining process of determining candidate fluorescent substances of the unknown sample registered in a sample table using a measured 3D fluorescence spectrum of the unknown sample, the candidate fluorescent substance determining process including:
setting first peaks, spectrum ranges, and sets of sub-peaks in the 3D fluorescence spectrum in which measured fluorescence intensity values are expressed by contour lines;
performing determination processing based on the read-in model coefficients: and
displaying candidate fluorescent substances and a candidate sample extracted by the determination processing in such a manner that a name of the candidate sample and fluorescence characteristic information including the first peaks, the spectrum ranges, and sets of pieces of sub peak information, and a 3D fluorescence spectrum in which at least the first peaks and the spectrum ranges are indicated are displayed on the same screen of the monitor so as to enable recognition of determination results.

According to another exemplary embodiment of the present disclosure, there is provided an unknown sample determining program of causing a photometer unit to measure a 3D fluorescence spectrum by shining excitation light on a measurement sample according to an instruction from a controller, causing a data processing unit to store the measured 3D fluorescence spectrum in three dimensions of the excitation wavelength, the fluorescence wavelength, and the fluorescence intensity, and causing the data processing unit to execute a candidate fluorescent substance determining process based on stored data to determine candidate fluorescent substances and a candidate sample,
wherein the unknown sample determining program performs a series of processes including:
executing a standard process of performing measurements on standards whose determination information to become a target variable and a fluorescence characteristic such as density information are known in advance, and calculating model coefficients for each pair of an excitation wavelength and a fluorescence wavelength by performing a multivariate analysis on 3D fluorescence spectra; and
executing a sample process of identifying an unknown sample or obtaining a target value such as success/failure or a density based on the model coefficients calculated by the standard process.

BRIEF DESCRIPTION OF THE DRAWINGS

In the accompanying drawings:

FIG. 3A-3D show a flowchart of a candidate fluorescent substance determining process, which is a subroutine of the flowchart shown in FIG. 9;

FIG. 13A shows an example display of a list showing results of each candidate fluorescent substance determining process, and FIG. 13B shows an example display of a list showing a result of determination of a candidate fluorescent substance;

FIG. 14 shows an example display of a list showing results of determination of candidate fluorescent substances corresponding to plural respective peaks; and FIG. 15 shows an example display of a list of a candidate sample determination result.

DETAILED DESCRIPTION

Fluorescence spectrophotometers according to embodiments of the present disclosure will be hereinafter described with reference to the drawings. The drawings are schematic ones, and the embodiments merely illustrate the technical concept of the invention and hence should not be construed as restricting the invention.

Embodiment 1

Figure 1:
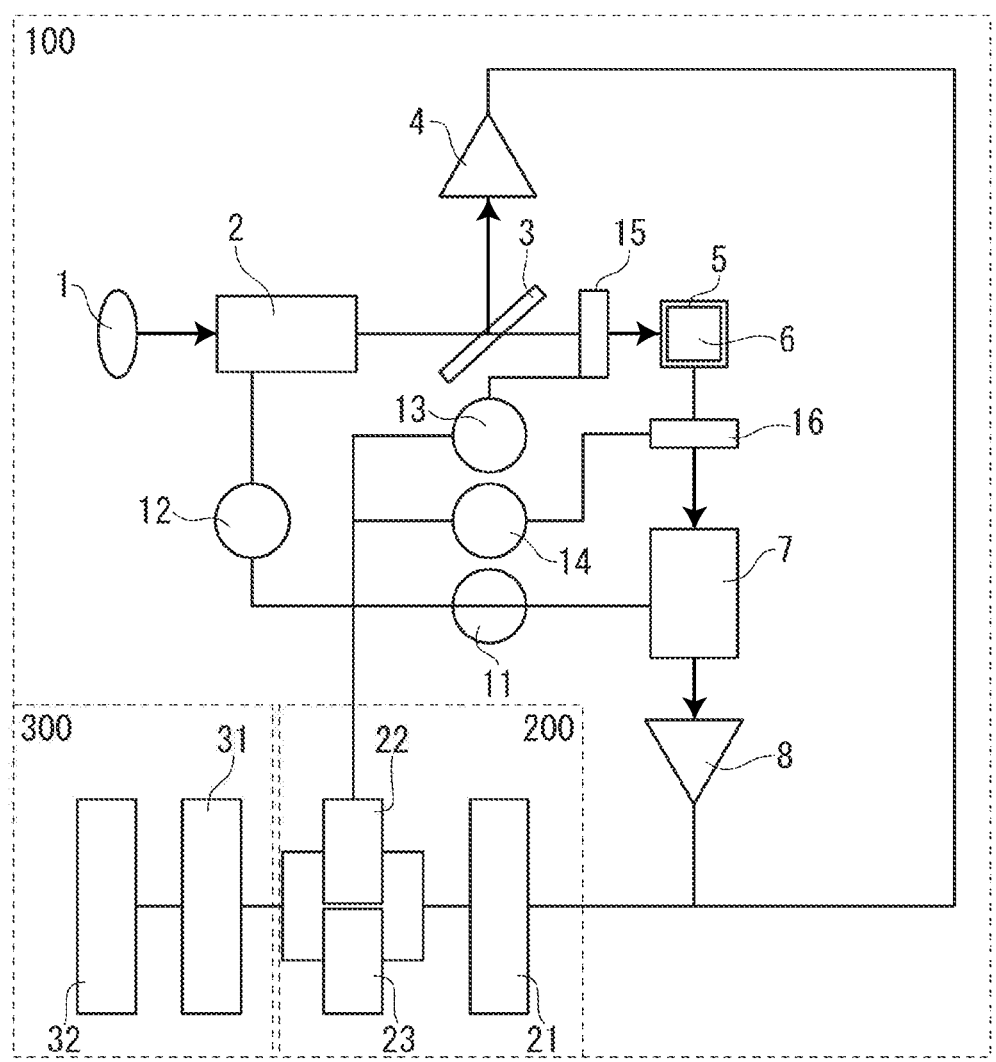
FIG. 1 shows the configuration of a fluorescence spectrophotometer employed in embodiments of the present disclosure.

As shown in FIG. 1, the fluorescence spectrophotometer includes a photometer unit 100, a computer unit 200, and an interface unit 300. An analyst inputs measurement conditions through an operating panel 32 of the interface unit 300. According to the input conditions, continuous wave light emitted from a light source 1 is split by an excitation-side spectroscope 2 to produce excitation light, part of which is shone, via a beam splitter 3, on a measurement sample 6 that is mounted on a sample mounting stage 5.

An excitation-side slit is included in the excitation-side spectroscope 2, and resolution of monochrome light that is extracted from continuous wave light is determined by setting a width of the slit. A light quantity of the part, separated by the beam splitter 3, of the excitation light is measured by a monitoring detector 4, whereby a variation in the light source 1 is corrected.

Fluorescent light emitted from the sample 6 is split by a fluorescence-side spectroscope 7 to produce monochrome light, which is detected by a detector 8. A fluorescence-side slit is included in the fluorescence-side spectroscope 7, and resolution of monochrome light that is separated from fluorescent light is determined by setting a width of the slit.

A signal detected by the detector 8 is received by a data processing unit 23 as a signal intensity via an A/D converter 21, and a measurement result is displayed on a monitor 31.

A wavelength-related drive system will be described below. An excitation-side pulse motor 12 is driven according to an instruction from a controller 22 and the excitation-side spectroscope 2 is thereby set at an intended wavelength. And a fluorescence-side pulse motor 11 is driven according to an instruction from the controller 22 and the fluorescence-side spectroscope 7 is thereby set at an intended wavelength.

Each of the excitation-side spectroscope 2 and the fluorescence-side spectroscope 7 employs such an optical element as a diffraction grating or a prism, and a spectrum scan is performed by rotating the optical element via gears and a cam using motive power produced by the excitation-side pulse motor 12 or the fluorescence-side pulse motor 11.

An excitation-side filter 15 is disposed between the excitation-side spectroscope 2 and the measurement sample 6. One of plural cut filters is inserted into the optical path as the excitation-side filter 15 by an excitation-side filter pulse motor 13. A fluorescence-side filter 16 is disposed between the measurement sample 6 and the fluorescence-side spectroscope 7. One of plural cut filters is inserted into the optical path as the fluorescence-side filter 16 by a fluorescence-side filter pulse motor 14.

A three-dimensional (3D) fluorescence spectrum is measured in the following manner. When excitation light emitted from the excitation-side spectroscope 2 that is set at a fixed wavelength is shone on the measurement sample 6, a fluorescence spectrum is measured as a wavelength scan is performed by the fluorescence-side spectroscope 7.

After completion of this fluorescence spectrum measurement, the fluorescence wavelength is returned to a start wavelength, the excitation wavelength is changed by a prescribed wavelength interval, and a fluorescence spectrum is measured at the resulting excitation wavelength. Resulting fluorescence spectra are stored in three dimensions, that is, the excitation wavelength, the fluorescence wavelength, and the fluorescence intensity.

Figure 2:
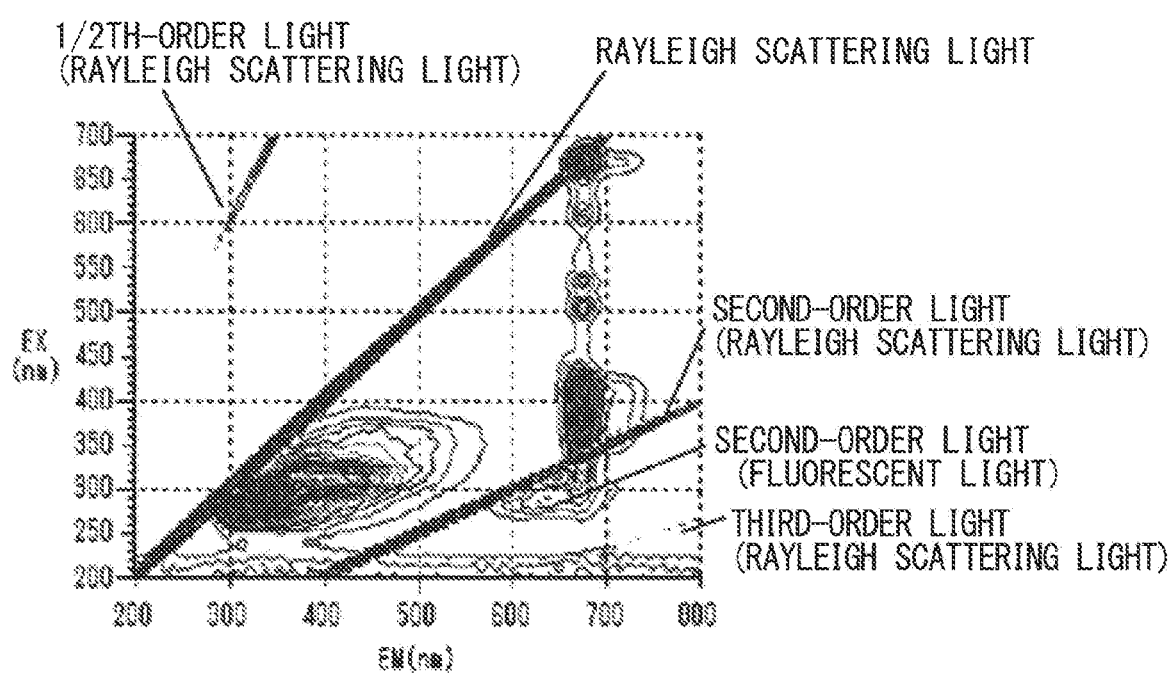
FIG. 2 is a graph showing an example three-dimensional fluorescence spectrum.
Figure 3B:
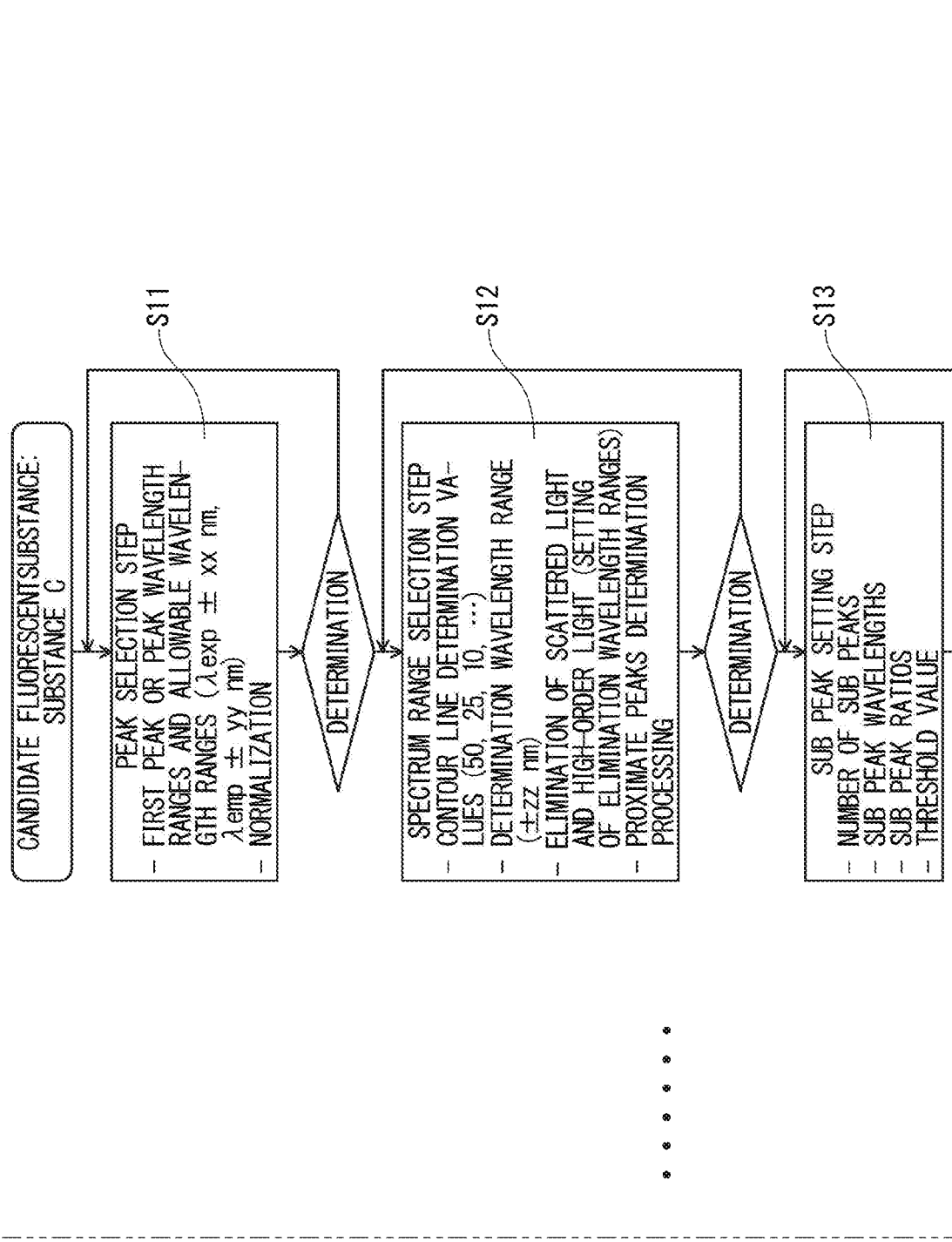
Figure 3C:
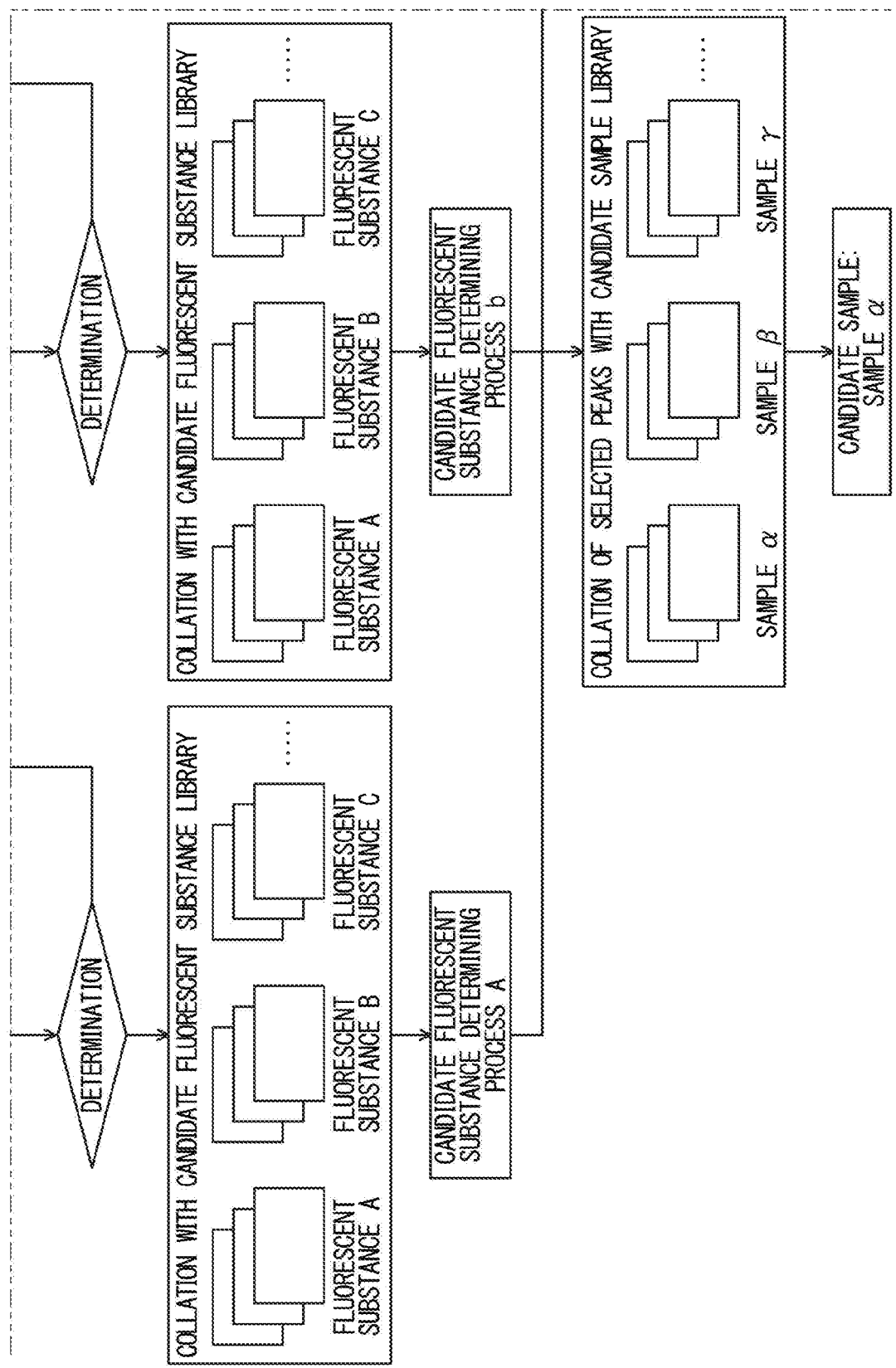
Figure 3D:
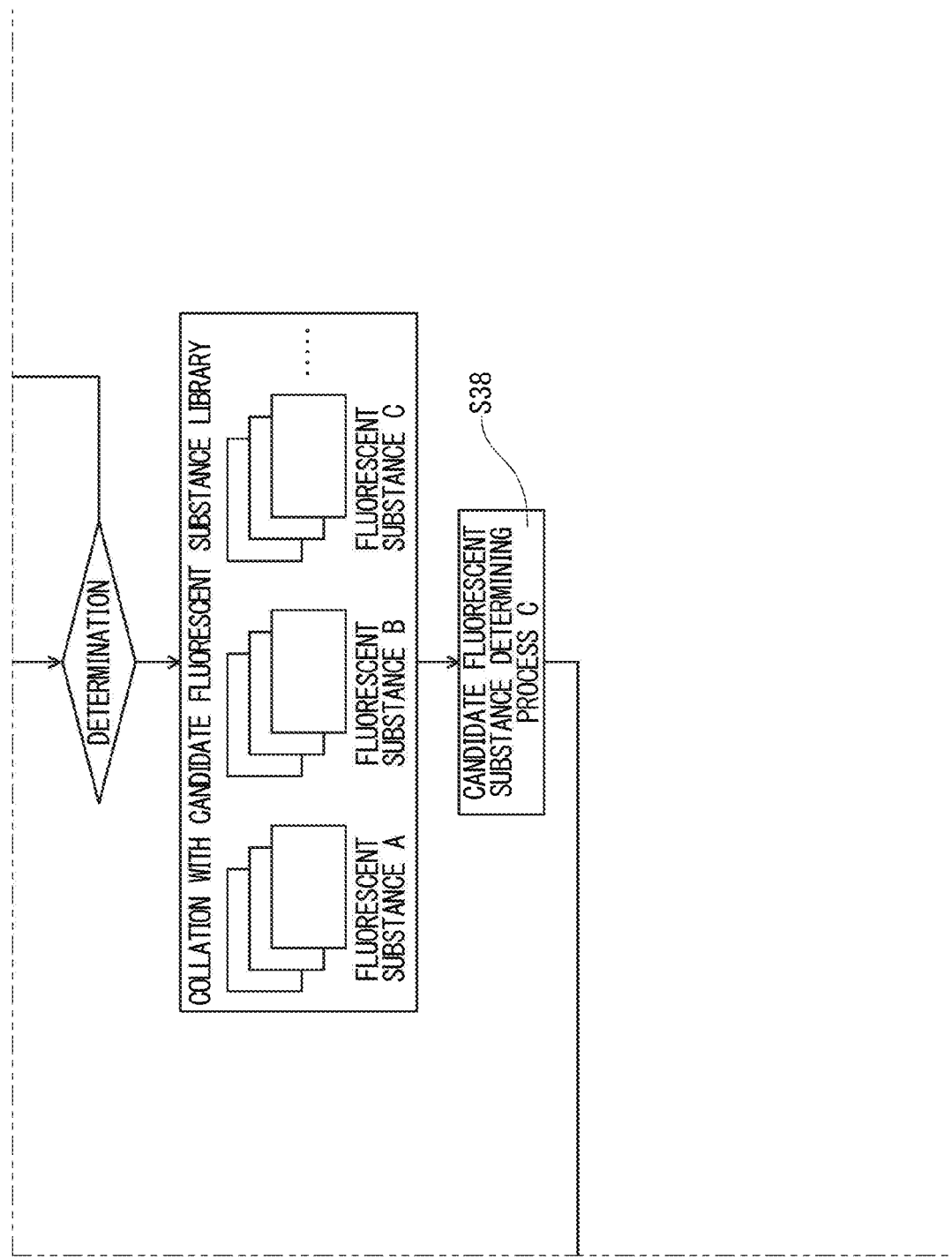

The above operation is performed repeatedly until a fluorescence spectrum corresponding to a final wavelength of a prescribed excitation wavelength range, whereby a 3D fluorescence spectrum is obtained and displayed in the form of a contour diagram as shown in FIG. 2.

Although the fluorescence spectrophotometer shown in FIG. 1 is a monochrometer in which a wavelength scan of the fluorescence-side spectroscope 7 is performed by the fluorescence-side pulse motor 11 and monochromatic light is detected by the detector 8 such as a photomultiplier, it can be implemented as a polychrometer that does not include the fluorescence-side pulse motor 11 and employs, as the detector 8, an area detector such as a CCD.

Fluorescence intensity values of a 3D fluorescence spectrum are shown with the vertical axis and the horizontal axis representing the excitation wavelength EX and the fluorescence wavelength EM, respectively. Alternatively, the vertical axis and the horizontal axis may represent the fluorescence wavelength and the excitation wavelength, respectively.

As long as a fluorescent substance remains the same, peak fluorescence wavelengths are kept constant irrespective of the excitation wavelength. Thus, a 3D fluorescence spectrum of a fluorescent substance assumes striped contour lines that reflect respective fluorescence intensity values.

The term "fluorescent substance" as used herein is a generic term of compounds that emit fluorescent light. Example fluorescent compounds are organic compounds such as L-tyrosine, L-tryptophan, vitamin E, and chlorophyll and inorganic compounds such as europium and terbium, as well as amorphous organic compounds such as humic acid and fulvic acid. Scattered light of excitation light appears at the same wavelength as the excitation light, and high-order light such as second-order light appears at a wavelength that is N times the wavelength of scattered light (N: integer).

Next, a process for determining a candidate fluorescent substance corresponding to a 3D fluorescence spectrum in the embodiment will be described with reference to FIGS. 3A-3D.

Figure 4:
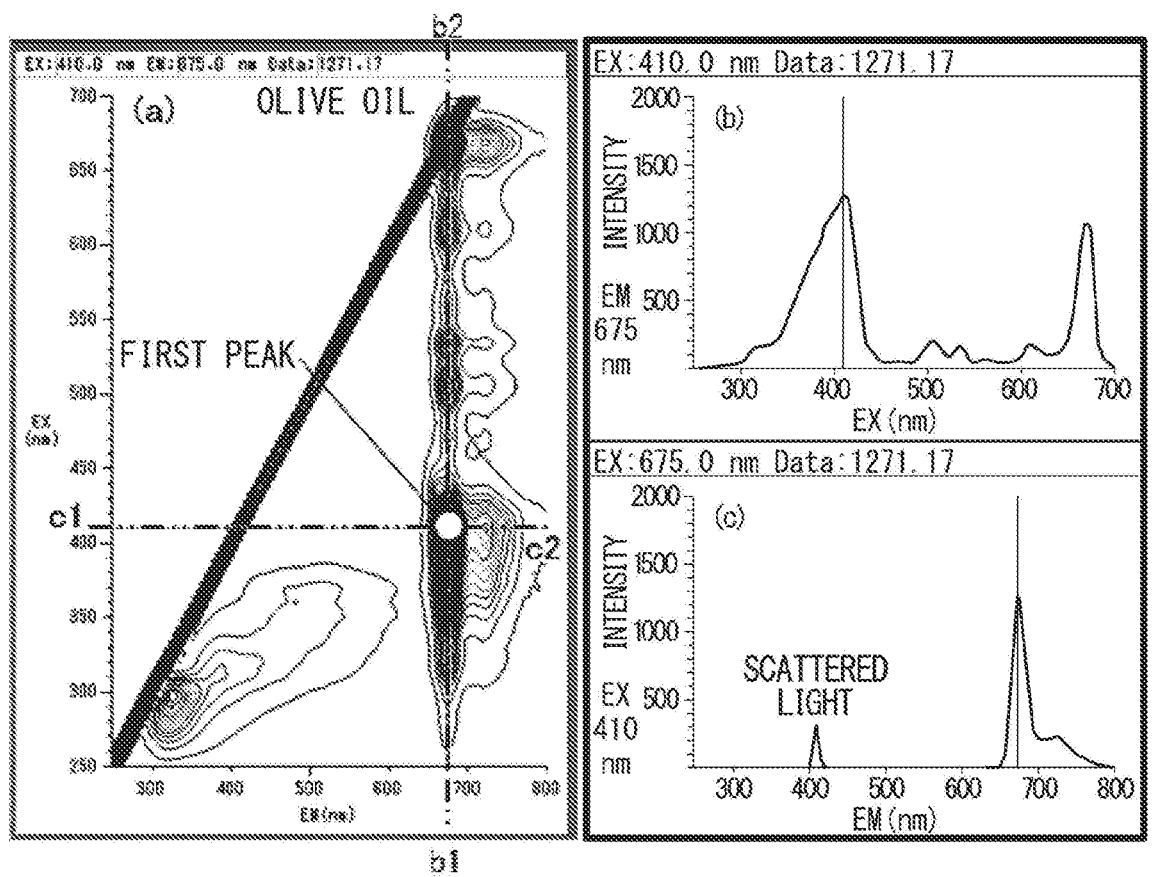
FIG. 4 illustrates an example of how a first peak is selected at a peak selection step.

First, at a peak selection step S11, an excitation wavelength and a fluorescence wavelength of a peak of attention as a first peak are selected in a measured 3D fluorescence spectrum. FIG. 4 shows an example first peak selected in a 3D fluorescence spectrum.

Fluorescent substance identification is made using the first peak and sub peaks appearing at the same fluorescence wavelength as of the first peak. The peak selection step S11 may be either such that a single peak is selected simply or such that an excitation wavelength range and a fluorescence wavelength range are set and an excitation wavelength and a fluorescence wavelength that provide a maximum intensity in these wavelength ranges are selected as peak wavelengths.

An excitation wavelength range and a fluorescence wavelength range (e.g., ±5 nm) with respect to the peak wavelengths are also input as search allowable ranges to be used in referring to a candidate fluorescent substance library.

Then it is determined whether the input wavelength ranges of the first peak are within measurement wavelength ranges (described later). If the determination result is negative, first peak wavelength are selected again.

Then the peak intensity of the selected first peak is normalized to a prescribed value to facilitate data comparison. In normalization processing, fluorescence intensity values in the entire wavelength ranges are multiplied by a normalization coefficient $C=F_n/F_0$ where $F_n$ is the normalized peak intensity and $F_0$ is the measured peak intensity. This processing makes it possible to compare peak intensity values of respective substances without causing distortion of spectrum shapes.

Where plural peaks exist at the same fluorescence wavelength EM as shown in FIG. 4, intensity values at respective excitation wavelengths are checked and a peak having a largest fluorescence intensity among them is employed as a first peak and used for normalization processing. In the embodiment, a normalization value "100" is used. Area (b) in FIG. 4 shows a fluorescence intensity curve at a fluorescence wavelength indicated by line b1-b2 in area (a) of FIG. 4, and area (c) of FIG. 4 shows a fluorescence intensity curve at an excitation wavelength indicated by line c1-c2 in area (a) of FIG. 4. These also apply to areas (a)-(c) of FIG. 5 to FIG. 8.

Figure 5:
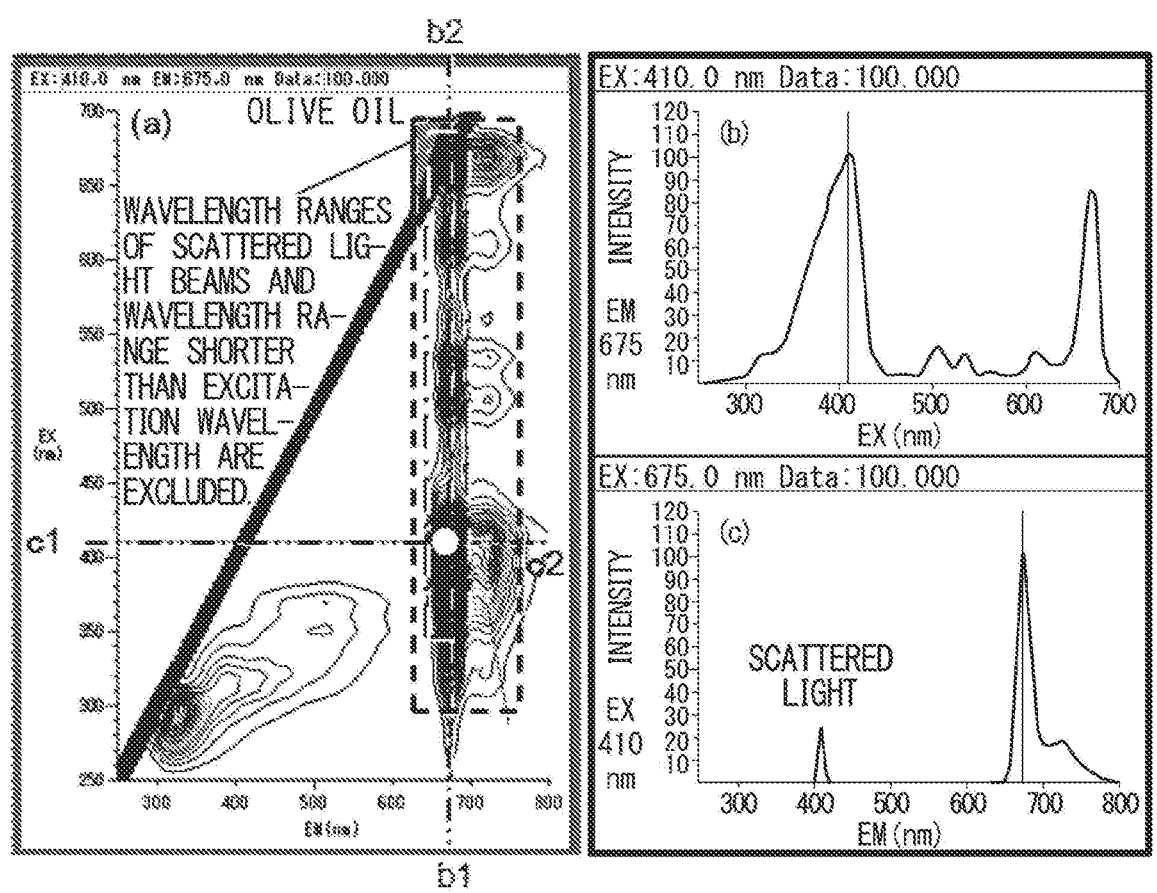
FIG. 5 illustrates an example of how a spectrum range is selected at a spectrum range selection step.

At a spectrum range selection step S12, spectrum ranges corresponding to a region enclosed by a broken line in area (a) of FIG. 5 are acquired. A spectrum range is defined by an excitation wavelength range and a fluorescence wavelength range and is set for each contour line determination value. The contour line determination value is a parameter that is specified by a measurer and indicates a threshold value for extraction of intensity data from a 3D fluorescence spectrum.

Figure 6:
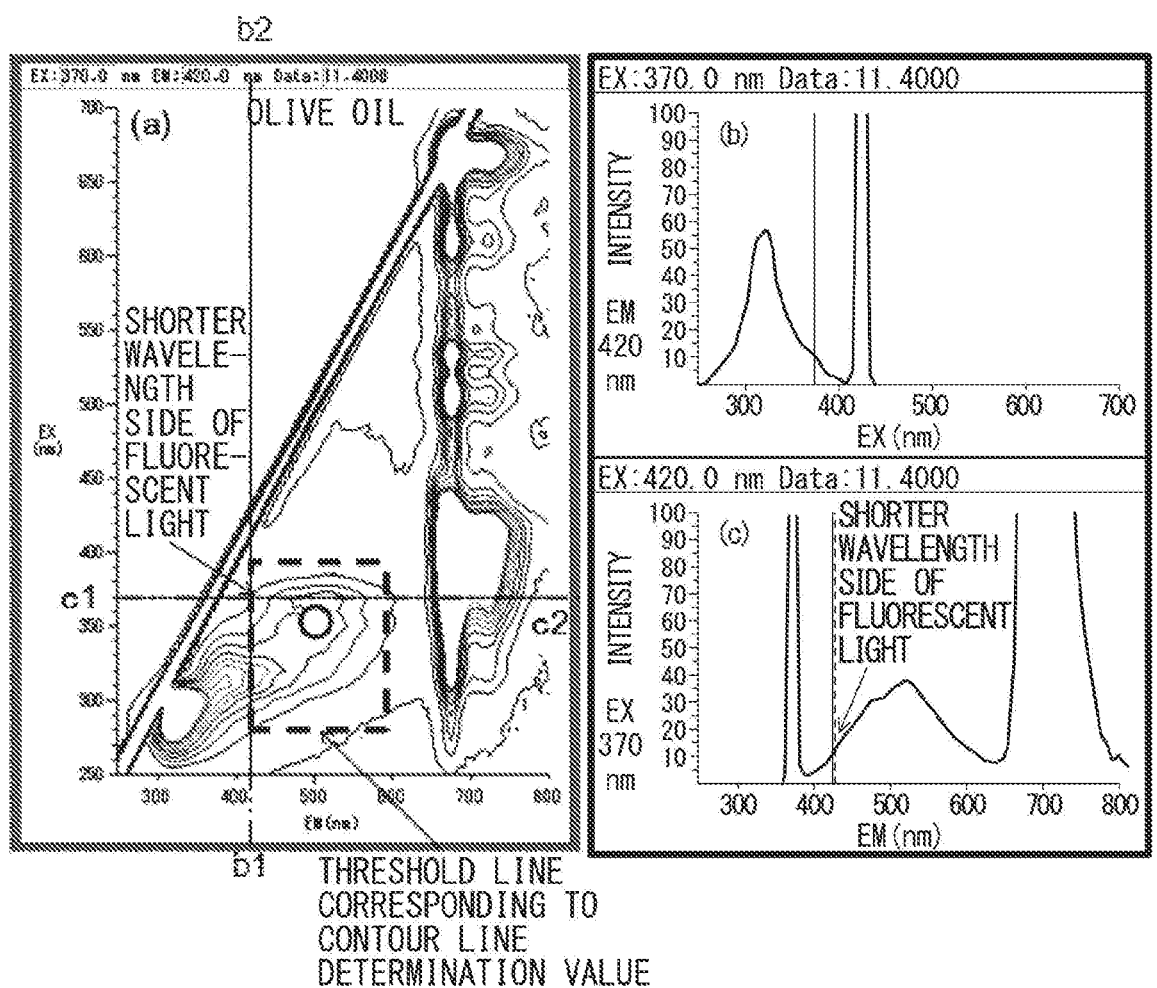
FIG. 6 illustrates an example of how a spectrum range is selected at the spectrum range selection step in the case where peaks exist close to each other.

For example, where the contour line determination value is set at "10," a spectrum range corresponding to an intensity "10" with respect to the normalized intensity "100" of the first peak that was set at the peak selection step S11 is searched for. And a target area is set that is defined by an excitation wavelength range and a fluorescence wavelength range. Widest wavelength ranges of a closed contour line that connects the same fluorescence intensity values are set. Then it is determined whether the thus-set spectrum range is included in measurement wavelength ranges. If the spectrum range is out of the measurement wavelength ranges, another spectrum range is set.

Where peaks of two fluorescent substances are located close to each other as shown in area (a) of FIG. 6, sets of contour lines of the two fluorescent substances overlap with each other, that is, contour lines of one fluorescent substance extend to wavelength ranges of the other fluorescent substance. In such a case, an excitation wavelength that is located on the shorter wavelength side or the longer wavelength side is set instead of an excitation wavelength corresponding to a maximum fluorescence intensity (proximate peaks determination processing), whereby a single fluorescence spectrum range that does not overlap with a fluorescence spectrum range of another fluorescent substance.

For example, as shown in area (c) of FIG. 6, by setting an excitation wavelength 370 nm, a fluorescence spectrum that is not influenced by a fluorescent substance whose fluorescence spectrum exists around a fluorescence wavelength 400 nm. A shorter-wavelength-side fluorescence wavelength range is determined based on the shape of this fluorescence spectrum.

Where a spectrum range is not set by the proximate peaks determination processing, a resulting spectrum range is given by an excitation wavelength range 255 to 390 nm and a fluorescence wavelength range 290 to 600 nm. On the other hand, where the proximate peaks determination processing is performed, a resulting spectrum range is given by an excitation wavelength range 280 to 390 nm and a fluorescence wavelength range 410 to 600 nm; a spectrum range that is specialized for a target peak can be selected.

A spectrum range is searched for in such a manner that the excitation wavelength of a target peak is shifted to the longer wavelength side if it overlaps with a shorter-wavelength-side peak and to the shorter wavelength side if it overlaps with a longer-wavelength-side peak.

In searching for a spectrum range corresponding to a contour line determination value, wavelength ranges of kinds of light other than fluorescent light, that is, a wavelength range of scattered light, wavelength ranges of high-order light beams that are generated in the case of an instrument not using a filter, and a wavelength range that is shorter than the excitation wavelength, are excluded from a search target.

In the case of a contour line determination value "10" shown in area (a) of FIG. 5, a spectrum range is given by an excitation wavelength range 300 to 680 nm and a fluorescence wavelength range 650 to 780 nm (indicated by a broken line in area (a) of FIG. 5). In the case of a contour line determination value "50", a spectrum range is given by an excitation wavelength range 340 to 670 nm and a fluorescence wavelength range 680 to 730 nm (indicated by a chain line in area (a) of FIG. 5). An allowable search error (wavelength error) for a contour line determination value is input as a determination wavelength range (e.g., ±10 nm). By obtaining a spectrum range corresponding to each contour line determination value, the 3D fluorescence spectrum is characterized by determining spectrum coincidence based on, for example, whether a 3D peak is broad or sharp.

At a sub peak setting step S13, peaks other than the first peak that was selected at the peak selection step S11 are determined in the spectrum range that was set at the spectrum range selection step S12. As for the region enclosed by a broken line in area (a) of FIG. 7, the first peak is indicated by a thick arrow and sub peaks are indicated by thin arrows in areas (b) and (c) of FIG. 7.

Sub peaks may be set either automatically by setting an intensity threshold value and extracting peaks that exceed the threshold value or manually by a measurer. In setting sub peaks, wavelength ranges of kinds of light other than fluorescent light, that is, a wavelength range of scattered light, wavelength ranges of high-order light beams that are generated in the case of an instrument not using a filter, and a wavelength range that is shorter than the excitation wavelength, are excluded from a setting target.

Allowable ranges, to be used in a search of sub peaks, for the number of sub peaks, sub peak ratios, sub peak excitation wavelengths EX, and sub peak fluorescence wavelengths EM are input. For example, values ±1, ±5, ±10 nm, and ±10 nm are input for the number of sub peaks, sub peak ratios, sub peak excitation wavelengths, and sub peak fluorescence wavelengths, respectively.

Sub peaks thus set are characterized based on the number of sub peaks, sub peak wavelengths, and sub peak intensity ratios. Whether each input sub peak wavelength is included in the measurement wavelength range is determined. If the input sub peak wavelength is out of the measurement wavelength range, the instrument causes the measurer to input a sub peak wavelength again. The term "sub peak ratio" means the ratio of a fluorescence intensity of a sub peak to the normalized fluorescence intensity of the first peak.

As shown in FIGS. 3A-3D, a candidate fluorescent substance is extracted through collation with a candidate fluorescent substance library that is prepared in advance. The candidate fluorescent substance library is a library of fluorescent substances produced by performing, in advance, measurements on fluorescent substances to become candidates, and contains, for each fluorescent substance, a peak excitation wavelength range and a peak fluorescence wavelength range that were obtained at the peak selection step S11, spectrum ranges that were set for respective contour line determination values at the spectrum range selection step S12, and the number of sub peaks, sub peak ratios, sub peak excitation wavelengths, and sub peak fluorescence wavelengths that were obtained at the sub peak selection step S13.

Measurement data are compared with the candidate fluorescent substance library in each process, whereby a candidate fluorescent substance is determined from the fluorescent substances contained in the candidate fluorescent substance library.

As shown in FIG. 13A, results obtained at the peak selection step S11, the spectrum range selection step S12, and the sub peak selection step S13 of each process is displayed in the form of a list. More specifically, the list contains peak wavelengths of a first peak that was specified at the peak selection step S11, a spectrum range (SPECTRUM RANGE −50) corresponding to a contour line determination value "50" and a spectrum range (SPECTRUM RANGE −10) corresponding to a contour line determination value "10" that were obtained at the spectrum range selection step S12, and sub peak information that was obtained at the sub peak selection step S13, that is, the number of sub peaks, sub peak ratios, sub peak excitation wavelengths EX, and sub peak fluorescence wavelengths EM.

As shown in FIG. 13B, a result of determination, from the candidate fluorescent substance library, of a candidate fluorescent substance that satisfies the above conditions is displayed in the form of a candidate fluorescent substance list.

As mentioned above, a measurement target such as a food, a chemical material, or an environmental substance in many cases contains plural fluorescent substances. As shown in area (a) of FIG. 8, when a single sample exhibits peaks corresponding to plural respective fluorescent substances exists, after determination of a candidate fluorescent substance for one peak (first peak), the next first peak is selected at the peak selection step S11 and the spectrum range selection step S12 and the sub peak selection step S13 are then executed to determine another candidate fluorescent substance.

FIG. 14 shows an example display of results of determination of candidate fluorescent substances corresponding to respective peaks. It is appropriate to display results of determination of candidate fluorescent substances together with their names. It is also appropriate to also show, for each candidate fluorescent substance, pieces of information that were used for the determination, that is, peak wavelengths, a spectrum range corresponding to a contour line determination value "50," a spectrum range corresponding to a contour line determination value "10", the number of sub peaks, sub peak ratios, sub peak excitation wavelengths EX, and sub peak fluorescence wavelengths EM.

Embodiment 2

By incorporating the candidate fluorescent substance determination process shown in FIGS. 3A-3D into a measurement process that performs a multivariate analysis on a 3D fluorescence spectrum, the accuracy of the multivariate analysis can be increased and its processing time can be shortened. An embodiment directed to this concept will be described below.

Figure 9:
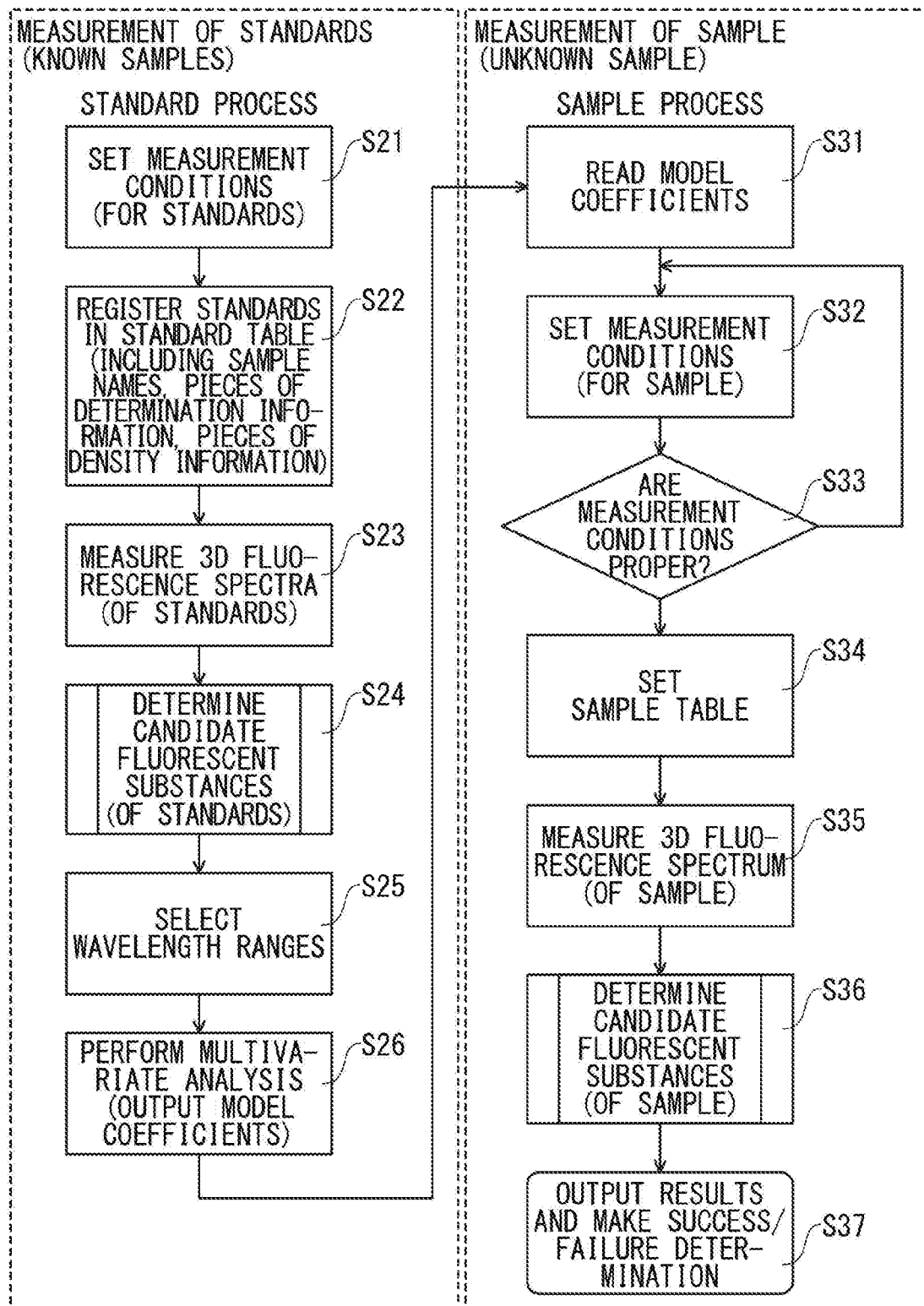
FIG. 9 is a flowchart illustrating a procedure of a multivariate analysis on a 3D fluorescence spectrum.

As shown in FIG. 9, a procedure for performing a multivariate analysis on 3D fluorescence spectra consists of a standard process of performing measurements on known samples as standards whose information determination information to become a target variable (production area information when a production area determination is intended and success/failure information when a success/failure determination is intended) and a fluorescence characteristic such as density information (for a regression analysis such as PLS) are known in advance and obtaining model coefficients for each pair of an excitation wavelength and a fluorescence wavelength, and a sample process of obtaining a target value of an unknown sample based on the model coefficients obtained by the standard process.

In the standard process, conditions under which to measure a 3D fluorescence spectrum of a standard are set at step S21. Wavelength range conditions are set that include an excitation start wavelength, an excitation end wavelength, an excitation data interval, a fluorescence start wavelength, a fluorescence end wavelength, and a fluorescence data interval. A condition that dictates a measurement speed is a wavelength scanning rate. Conditions that dictate resolution are an excitation-side slit width and a fluorescence-side slit width. A condition relating to a data response speed is a response setting value that relates to noise and resolution. A condition that determines sensitivity is a detector voltage.

A measurement time of one sample is determined by conditions of wavelength ranges and a measurement speed. If a wide excitation wavelength range and fluorescence wavelength range are set, the number of data and the measurement time are increased. In usual sample measurements, an excitation wavelength and a fluorescence wavelength at which fluorescence occurs are unknown. Thus, in general, a measurement is performed in a wide excitation wavelength range and fluorescence wavelength range and preprocessing is performed to obtain data to be used for an analysis by removing unnecessary data corresponding to scattered light, second-order light, etc. In this manner, data in an effective fluorescence wavelength range is used for the analysis.

To perform a multivariate analysis, measurement data of plural standards are necessary. Thus, at step S22, standards that are supposed to be subjected to measurement are registered in a standard table in advance. In addition to a sample name, information to become a target variable, that is, determination information (production area information when a production area determination is intended and success/failure information when a success/failure determination is intended) and density information (for a regression analysis such as PLS), is input for each standard.

At step S23, 3D fluorescence spectra of the standards are measured based on the standard table. At step S24, the candidate fluorescent substance determining process shown in FIGS. 3A-3D is executed on each measured 3D fluorescence spectrum, whereby candidate fluorescent substances are determined.

Figure 10:
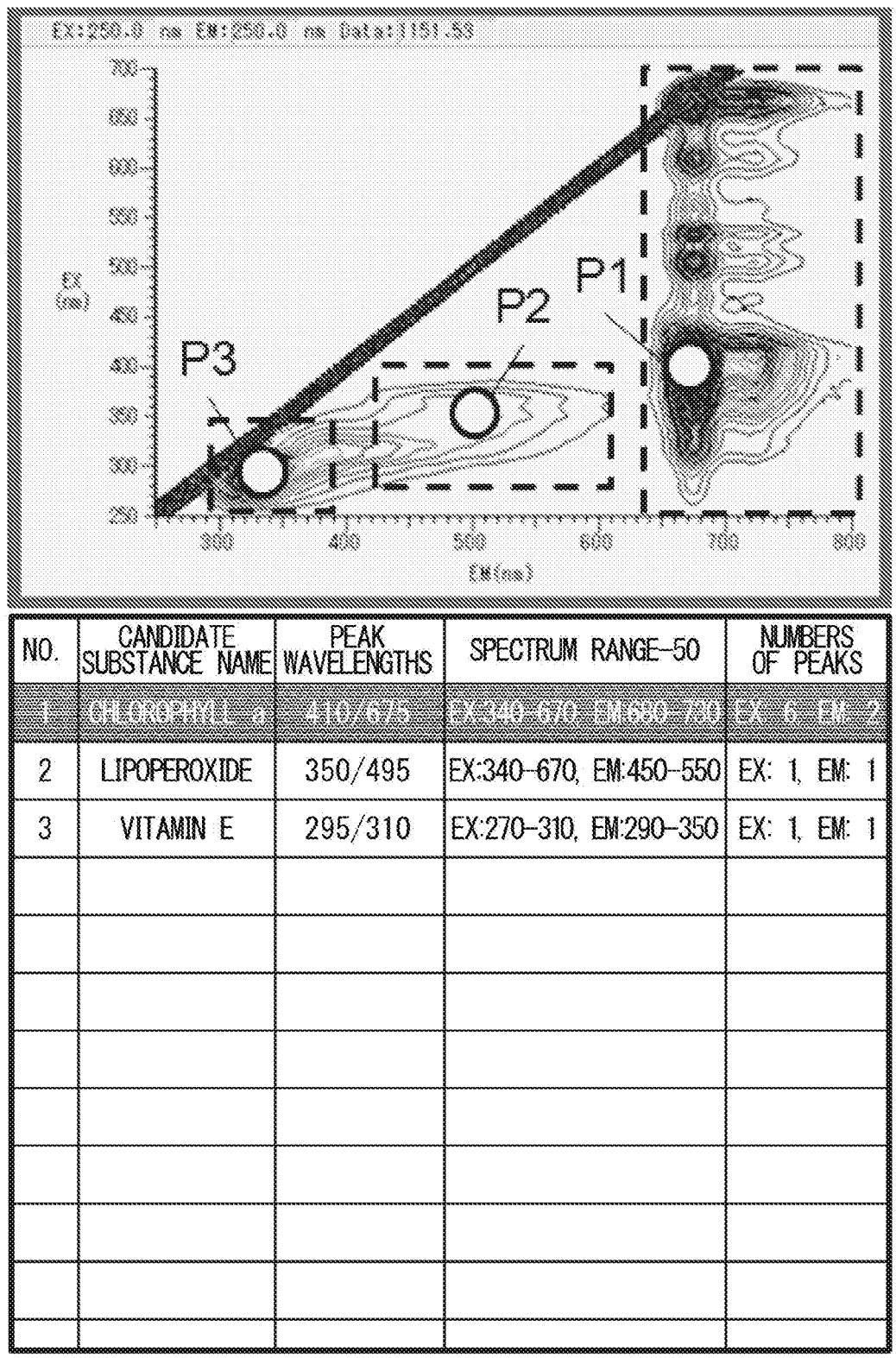
FIG. 10 shows an example display of a 3D fluorescence spectrum and a result of determination of candidate fluorescent substances.

FIG. 10 shows examples of a 3D fluorescence spectrum and a result of determination of candidate fluorescent substances. A 3D fluorescence spectrum and a result of determination of candidate fluorescent substances extracted based on peak wavelengths are displayed together. As indicated by marks "o" in FIG. 10, the peak wavelengths of the candidate fluorescent substances are plotted in the 3D fluorescence spectrum so as to be recognizable. Sub peak wavelengths may also be plotted so as to be recognizable. Spectrum ranges corresponding to a contour line determination value "50" or "10" are also displayed using a broken line or the like. Since the 3D fluorescence spectrum and the list of candidate fluorescent substances are displayed together, the candidate fluorescent substances for the respective peaks can be recognized visually. When one candidate fluorescent substance is selected, its peak wavelengths and spectrum range may be highlighted for determination.

Since spectrum ranges corresponding to a set contour line determination value and wavelengths to be used for a multivariate analysis are set using only data attributed to respective components, unnecessary data other than data of effective fluorescence regions can be eliminated. A contour line determination value to be used for setting spectrum ranges may be set in a desired manner.

If a multivariate analysis is performed in such a manner as to involve unnecessary data, the accuracy of analysis lowers. Furthermore, if a multivariate analysis involves too large a number of data, too long an analysis time may be needed depending on the performance of the data processing unit 23 and the analysis algorithm. Thus, reducing the number of data to be used for a multivariate analysis, that is, the number of spectrum ranges corresponding to a contour line determination value, is useful for increase of analysis accuracy and shortening of an analysis time. For these reasons, at step S25, data other than data in spectrum ranges corresponding to a contour line determination value are eliminated from data to be subjected to a multivariate analysis, that is, only the data in the spectrum ranges are subjected to the multivariate analysis.

Subsequently, at step S26, a model is obtained by performing a multivariate analysis such as a PLS regression analysis or a discriminant analysis using the data that have been set as a subject of the multivariate analysis. Since model coefficients obtained here are basically ones obtained based on the data in the spectrum ranges, correlation is made between sets of model coefficients corresponding to respective pairs of wavelengths and candidate fluorescent substances involved.

An average of model coefficients corresponding to each candidate fluorescent substance serves as an index to be used for determining whether the candidate fluorescent substance contributes to obtaining a target value. Whereas model coefficients corresponding to each pair of wavelengths are important finally, an average of model coefficients is useful for evaluation of influence of interaction between components that occurs in a case that plural fluorescent substances are included. For example, in the case of a PLS regression analysis, a component an average of whose model coefficients is negative has no correlation with a target value. On the other hand, a component an average of whose model coefficients is positive has correlation with a target value.

Next, a sample process will be described with reference to FIG. 9. In the sample process, at step S31, to perform a calculation on a measurement result of a sample, the model coefficients obtained at the multivariate analysis step S26 are read.

At step S32, sample measurement conditions are set. Basically, the sample measurement conditions are set the same as the standard measurement conditions. However, to shorten the measurement time, the excitation start wavelength, the excitation end wavelength, the excitation data interval, the fluorescence start wavelength, the fluorescence end wavelength, the fluorescence data interval, etc. that relate to the measurement wavelength ranges may be changed according to the measurement wavelength ranges that were selected at step S25 of the standard process.

At step S33, it is determined whether the pairs of an excitation wavelength and a fluorescence wavelength corresponding to the sets of model coefficients that were read at step S31 are included in the respective pairs of measurement wavelength ranges, and whether the wavelength scanning rate, the excitation-side slit width, the fluorescence-side slit width, the response setting value, and the detector voltage are the same as those of the standard measurement conditions. Since the measurement conditions influence the resolution and sensitivity and hence fluorescence intensity values, the measurement conditions other than the measurement wavelength ranges should not be changed. The determination step S33 is executed to equalize these sample measurement conditions to the corresponding standard measurement conditions, to avoid measurement errors.

At step S34, a sample table is set in advance for a sample to be subjected to measurement. In setting a sample table, a success/failure determination condition and determination value names may be determined. An example of the success/failure determination condition is a threshold value for a determination on a target value obtained by a multivariate analysis. Examples of the determination value names are "larger" indicating that a target value obtained is larger than the threshold value, "smaller" indicating that a target value obtained is smaller than the threshold value, "larger or smaller" indicating a destination item of a case that a target value obtained is the same as the threshold value.

At step S35, a 3D fluorescence spectrum of the sample is measured according to the sample table set at step S34. At step S36, candidate fluorescent substances are determined according to the candidate fluorescent substance determining process shown in FIGS. 3A-3D. At step S37, a success/failure determination is made and a result is output. The 3D fluorescence spectrum and a result of determination of candidate fluorescent substances are displayed as shown in FIG. 10.

Figure 11:
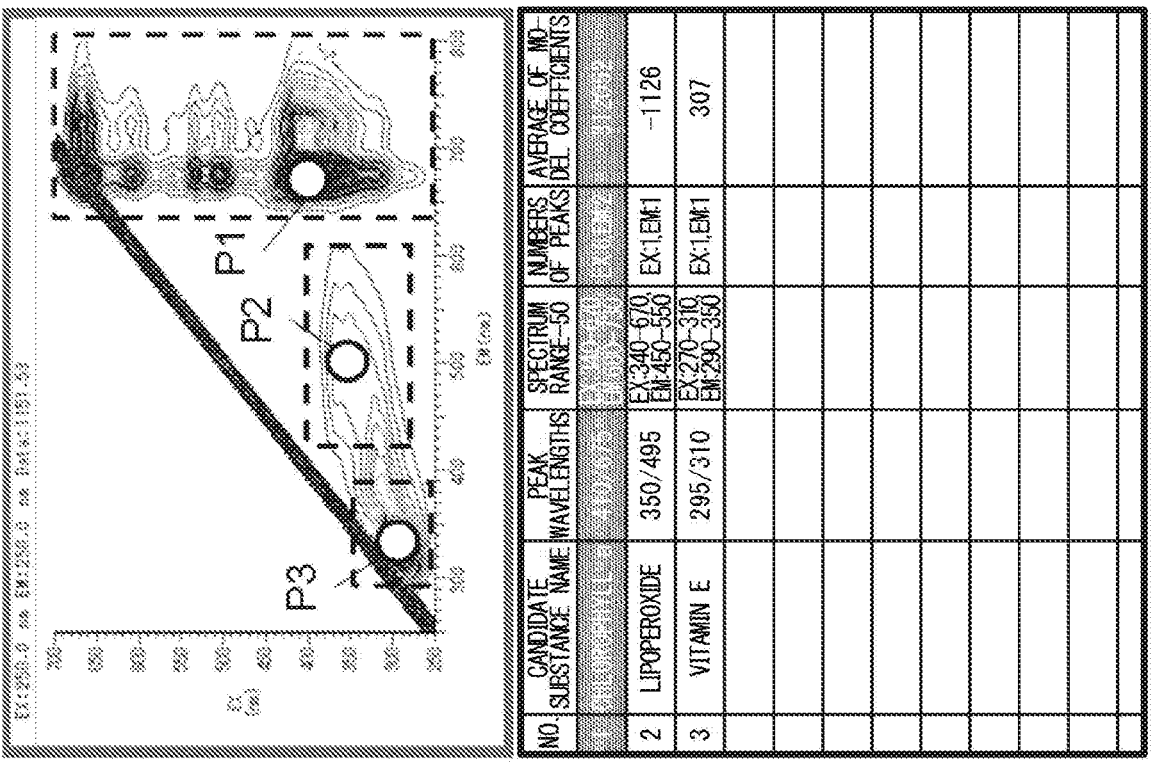
FIG. 11 shows an example display of a measurement result of the fluorescence spectrophotometer.

A final measurement result of the entire process including the standard process and the sample process is displayed as shown in FIG. 11. Information of the standard table that was set in the standard process is displayed in a top-left part of the screen. Values of the calculation that was performed using the model coefficients that were read at step S31 and results of success/failure determinations made according to the success/failure determination condition that was set in the sample table at step S34 are added to the sample table that was set in the sample process, and resulting information is displayed in a bottom-left part of the screen. A 3D fluorescence spectrum of an item selected from the standard information displayed in the top-left part or the sample information displayed in the bottom-left part is displayed in a top-right part of the screen.

Displayed in a bottom-right part of the screen is a list of candidate fluorescent substances, obtained at step S24, of the item selected from the standard information displayed in the top-left part or a list of candidate fluorescent substances, obtained at step S36, of the item selected from the sample information displayed in the bottom-left part. Also displayed is an average of the model coefficients, calculated at step S26 in the standard process, of each candidate fluorescent substance. If a fluorescent substance other than the candidate fluorescent substances that were obtained in the standard process is obtained in the sample process, no average of model coefficients of that fluorescent substance is displayed.

In the 3D fluorescence spectrum displayed in the top-right part of the screen, the peak wavelengths of the candidate fluorescent substances may be plotted so as to be recognizable, in the same manner as in the 3D fluorescence spectrum shown in FIG. 10. Likewise, the sub peak wavelengths may also be plotted so as to be recognizable. Spectrum ranges corresponding to contour line determination values "50" and "10" may further be displayed.

Since the list of candidate fluorescent substances and the 3D fluorescence spectrum are displayed on the same screen, the candidate fluorescent substance for a peak of attention can be recognized visually. When one candidate fluorescent substance is selected, its peak wavelengths and spectrum range may be highlighted for determination.

Embodiment 3

In Embodiment 2, fluorescent substances are identified using fluorescence characteristics of 3D fluorescence spectra of standards measured in the standard process. In contrast, in the case of an unknown measurement target sample whose classification/family information etc. (determination information) such as whether it is an organic material or an inorganic material or whether it is a food or a medicine are not available, the sample is identified by executing the candidate fluorescent substance determining process shown in FIGS. 3A-3D.

In the case of an unknown sample whose determination information is not available, the sample process is executed without executing the standard process (see FIG. 9). Sample measurement conditions are set at step S32, a sample table is set at step S34 by inputting pieces of sample information, and a 3D fluorescence spectrum of the sample is measured at step S35 according to the conditions that were set at step S32. The candidate fluorescent substance determining process shown in FIGS. 3A-3D, which includes the peak selection step S11, the spectrum range selection step S12, and the sub peak selection step S13, is performed on a 3D fluorescence spectrum obtained, whereby pieces of fluorescence characteristic information are obtained.

Figure 12:
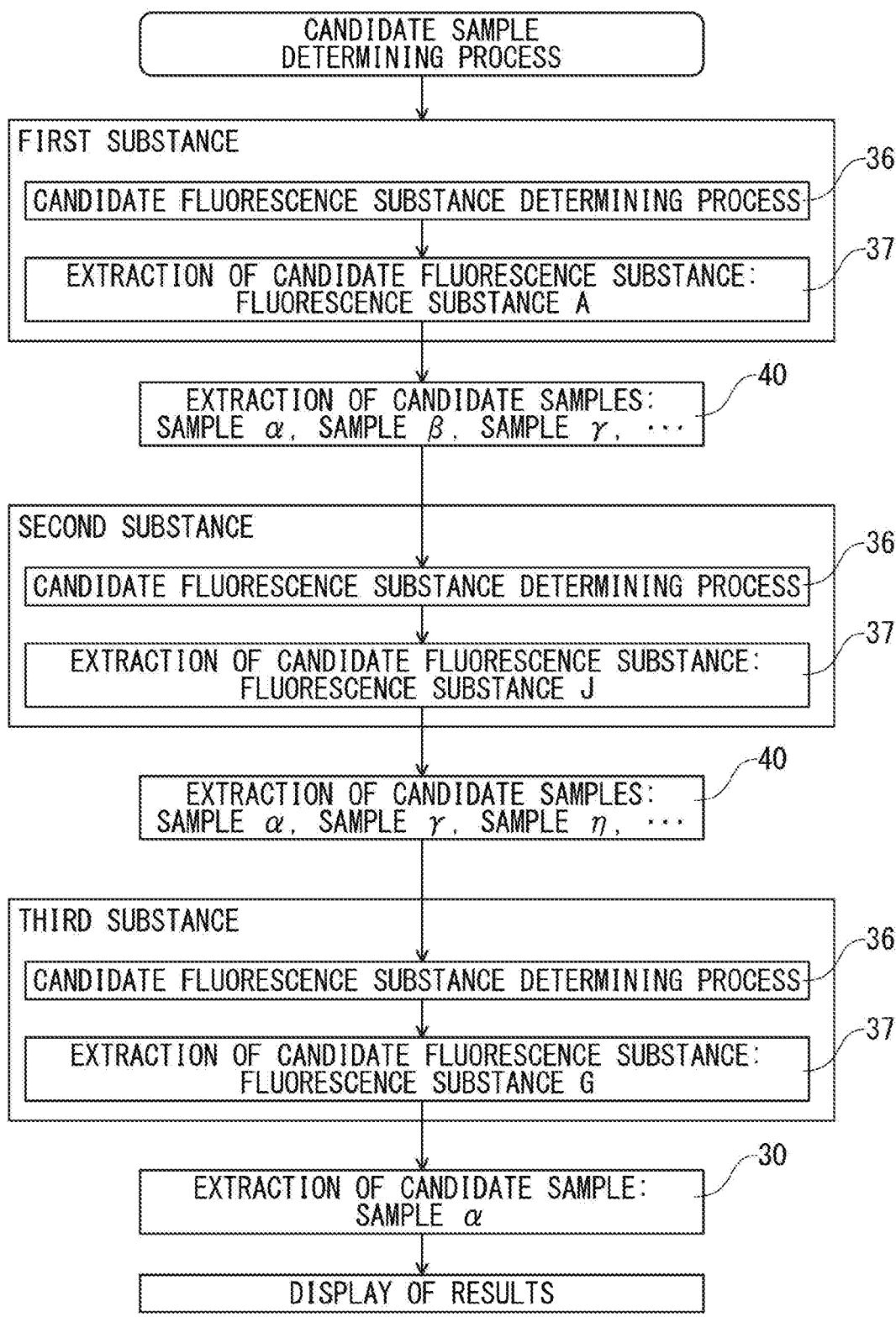
FIG. 12 is a flowchart of a candidate fluorescent sample determining process that is executed in a case that plural kinds of fluorescence characteristics are obtained from a 3D fluorescence spectrum.

Candidate fluorescent substances are determined by collating obtained peak wavelengths, spectrum ranges, and pieces of sub peak information with a candidate fluorescent substance library. A sample containing the thus-determined candidate fluorescent substances is extracted from a candidate fluorescent sample library. A measurement target sample such as a food, a chemical material, or an environmental substance in many cases contains plural fluorescent substances and plural kinds of fluorescence characteristics may be obtained from a 3D fluorescence spectrum. Where plural kinds of fluorescence characteristics are obtained from a 3D fluorescence spectrum, as shown in FIG. 12, determination of candidate fluorescent substances of an unknown sample and extraction of a candidate sample that were described above are performed repeatedly and candidate samples are thereby narrowed down. A candidate sample that exhibits an effective fluorescence characteristic is extracted finally from the candidate fluorescent sample library.

The configuration of an unknown sample determining instrument according to Embodiment 3 of the present disclosure will be described below with reference to FIG. 1. Whereas the unknown sample determining instrument according to Embodiment 3 can be used suitably for the above-described unknown sample determining method, the measuring device used therein is not limited to the one described below.

FIG. 1 shows a fluorescence spectrophotometer which includes a photometer unit 100, a computer unit 200, and an interface unit 300. An analyst inputs measurement conditions through an operating panel 32 of the interface unit 300. Continuous wave light emitted from a light source 1 is split by an excitation-side spectroscope 2 to produce excitation light, part of which is shone, via a beam splitter 3, on a measurement sample 6 that is mounted on a sample mounting stage 5. An excitation-side slit is included in the excitation-side spectroscope 2, and resolution of monochrome light that is extracted from white light is determined by setting a width of the slit. A light quantity of the part, separated by the beam splitter 3, of the excitation light is measured by a monitoring detector 4, whereby a variation in the light source 1 is corrected.

Fluorescent light emitted from the sample 6 is split by a fluorescence-side spectroscope 7 to produce monochrome light, which is detected by a detector 8. A fluorescence-side slit is included in the fluorescence-side spectroscope 7, and resolution of monochrome light that is separated from fluorescent light is determined by setting a width of the slit. A signal detected by the detector 8 is received by a data processing unit 23 as a signal intensity via an A/D converter 21, and a measurement result is displayed on a monitor 31.

A wavelength-related drive system will be described below. An excitation-side pulse motor 12 is driven according to an instruction from a controller 22 and the excitation-side spectroscope 2 is thereby set at an intended wavelength. And a fluorescence-side pulse motor 11 is driven according to an instruction from the controller 22 and the fluorescence-side spectroscope 7 is thereby set at an intended wavelength. Each of the excitation-side spectroscope 2 and the fluorescence-side spectroscope 7 employs such an optical element as a diffraction grating or a prism, and a spectrum scan is performed by rotating the optical element via gears and a cam using motive power produced by the excitation-side pulse motor 12 or the fluorescence-side pulse motor 11.

An excitation-side filter 15 is disposed between the excitation-side spectroscope 2 and the measurement sample 6. One of plural cut filters is inserted into the optical path as the excitation-side filter 15 by an excitation-side filter pulse motor 13. A fluorescence-side filter 16 is disposed between the measurement sample 6 and the fluorescence-side spectroscope 7. One of plural cut filters is inserted into the optical path as the fluorescence-side filter 16 by a fluorescence-side filter pulse motor 14.

A 3D fluorescence spectrum is measured in the following manner. When excitation light emitted from the excitation-side spectroscope 2 that is set at a fixed wavelength is shone on the measurement sample 6, a fluorescence spectrum is measured as a wavelength scan is performed by the fluorescence-side spectroscope 7. After completion of this fluorescence spectrum measurement, the fluorescence wavelength is returned to a start wavelength, the excitation wavelength is changed by a prescribed wavelength interval, and a fluorescence spectrum is measured at the resulting excitation wavelength. Resulting fluorescence spectra are stored in three dimensions, that is, the excitation wavelength, the fluorescence wavelength, and the fluorescence intensity. The above operation is performed repeatedly until a fluorescence spectrum corresponding to a final wavelength of a prescribed excitation wavelength range, whereby a 3D fluorescence spectrum is obtained and displayed in the form of a contour diagram as shown in FIG. 2.

Although the fluorescence spectrophotometer shown in FIG. 1 is a monochrometer in which a wavelength scan of the fluorescence-side spectroscope 7 is performed by the fluorescence-side pulse motor 11 and monochromatic light is detected by the detector 8 such as a photomultiplier, it can be implemented as a polychrometer that does not include the fluorescence-side pulse motor 11 and employs, as the detector 8, an area detector such as a CCD. Fluorescence intensity values of a 3D fluorescence spectrum are shown with the vertical axis and the horizontal axis representing the excitation wavelength EX and the fluorescence wavelength EM, respectively. Alternatively, the vertical axis and the horizontal axis may represent the fluorescence wavelength and the excitation wavelength, respectively.

The data processing unit 23 performs a 3D fluorescence spectrum measurement on a standard process shown in FIG. 9 that is registered in a standard table under measurement conditions that have been input through the operating panel 32, and determines candidate fluorescent substances using a measurement result. The data processing unit 23 causes the monitor 31 to display, as a 3D fluorescence spectrum measurement result, a contour diagram as shown in area (a) of FIG. 4.

A first peak that was selected at the peak selection step S11 shown in FIGS. 3A-3D may be plotted in the form of a mark "o," for example, to facilitate its recognition. Trace lines b1-b2 and c1-c2 shown in area (a) of FIG. 4 may be drawn for the selected first peak. The trace line b1-b2 corresponds to an excitation spectrum to be obtained when the excitation wavelength is varied while the fluorescence wavelength is fixed. This excitation spectrum is displayed as shown in area (b) of FIG. 4. The trace line c1-c2 of area (a) of FIG. 4 corresponds to a fluorescence spectrum to be obtained when the fluorescence wavelength is varied while the excitation wavelength is fixed. This excitation spectrum is displayed as shown in area (c) of FIG. 4.

When a spectrum range is selected at the spectrum range selection step S12, the selected spectrum range is indicated by a broken line as shown in area (a) of FIG. 5.

Figure 7:
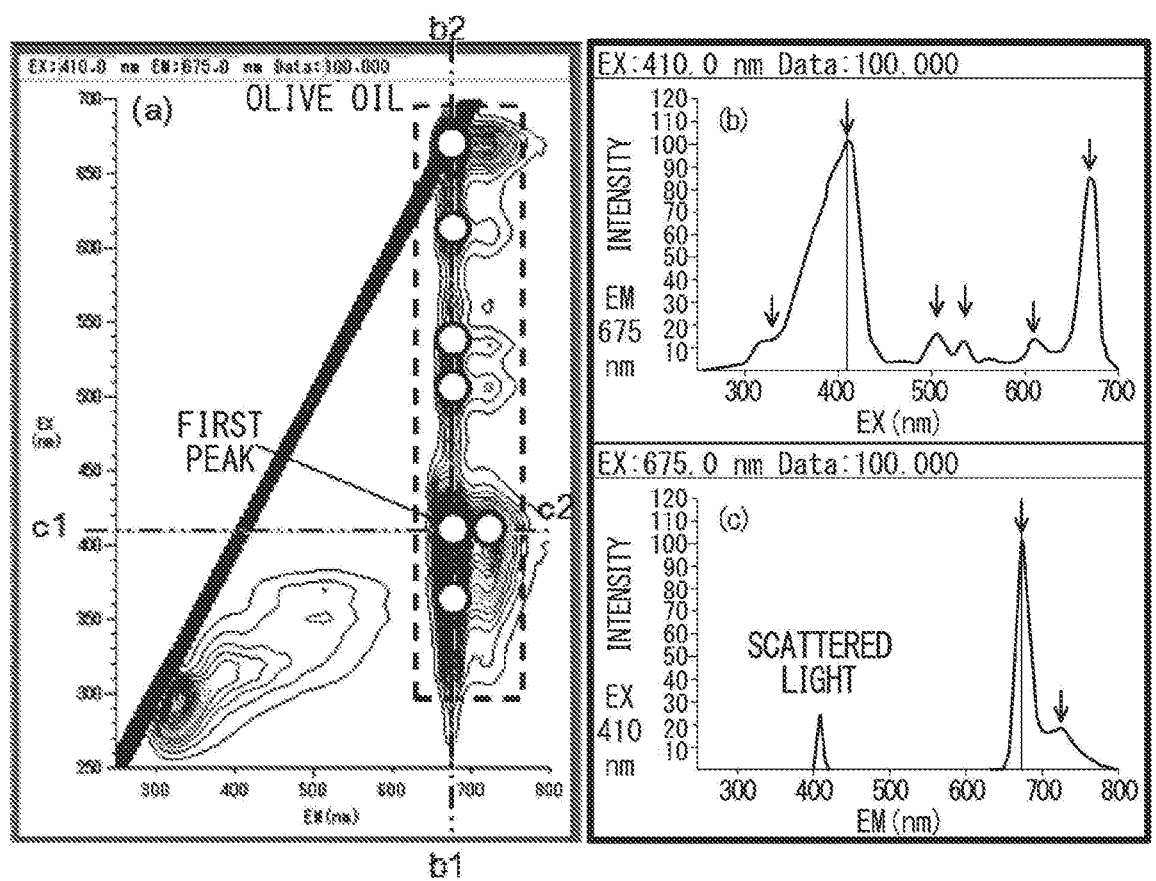
FIG. 7 illustrates an example of how sub peak wavelength are selected at a sub peak selection step.

Sub peaks that were selected at the sub peak selection step S13 shown in FIGS. 3A-3D may be plotted in the form of marks "o," for example, as shown in area (a) of FIG. 7 to facilitate its recognition. As shown in area (b) of FIG. 7, excitation wavelengths of part of the sub peaks indicated by marks "o" in area (a) of FIG. 7 are indicated by arrows, for example. Likewise, as shown in area (c) of FIG. 7, a fluorescence wavelength of one of the sub peaks indicated by marks "o" in area (a) of FIG. 7 may be indicated by an arrow, for example.

Figure 8:
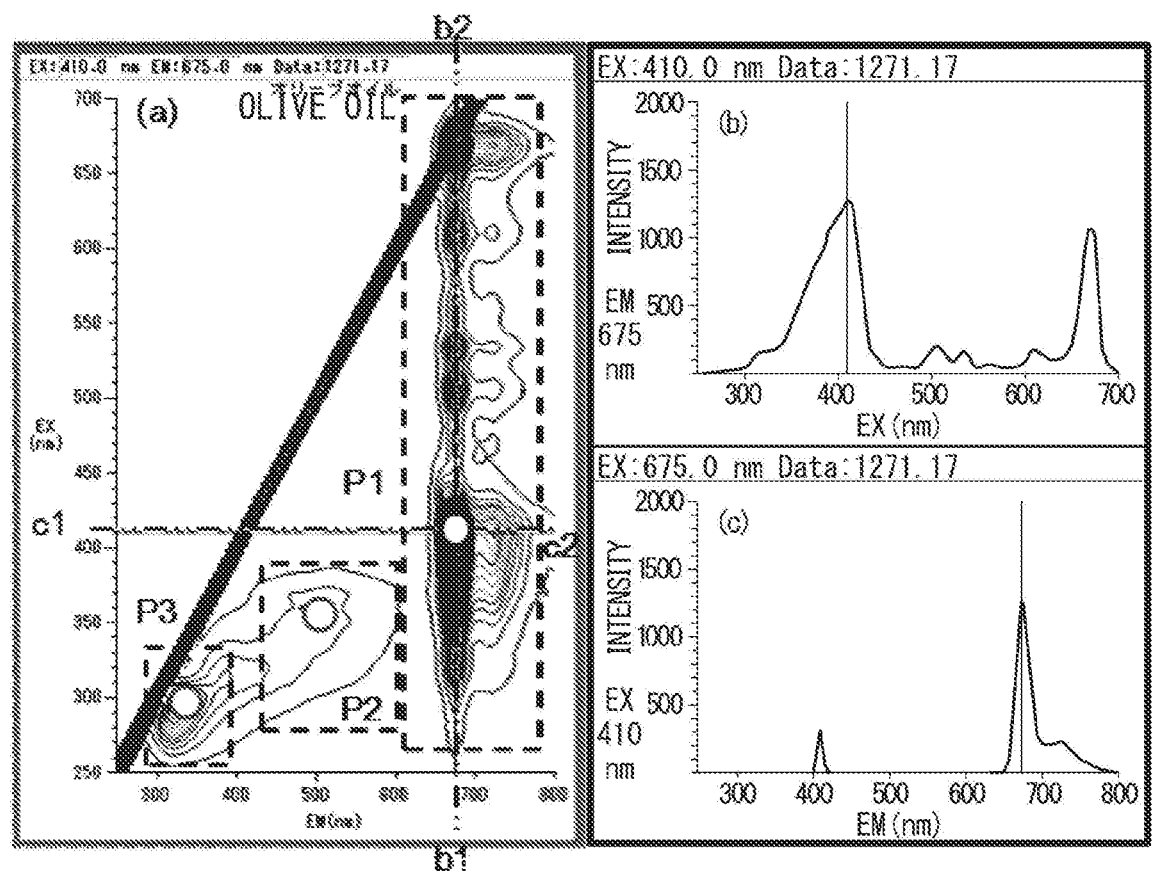
FIG. 8 shows an example display of a fluorescence characteristic of a sample that exhibits plural first peaks.

As shown in area (a) of FIG. 8, when the same sample exhibits peaks corresponding to plural respective fluorescent substances exists, a first peak and sub peaks are plotted and a spectrum range is displayed for each of them. The data processing unit 23 searches for a candidate fluorescent substance according to the candidate fluorescent substance determining process shown in FIGS. 3A-3D, and displays, on the monitor 31, results of the peak selection step S11, the spectrum range selection step S12, and the sub peak selection step S13 shown in FIGS. 3A-3D and a list of candidate fluorescent substances. A table shown in FIG. 14 is displayed finally on the monitor 31 as analysis results of plural candidate fluorescent substances.

Next, the data processing unit 23 eliminates data other than data in spectrum ranges being set based on the contour line determination value from data to be subjected to a multivariate analysis, and selects only the data in the effective 3D fluorescence spectrum ranges are subjected to the multivariate analysis. The multivariate analysis including PLS regression analysis and discriminant analysis is performed using this data, and the model coefficients are obtained and stored in the data processing unit 23.

In the sample process, it is determined whether the input measurement conditions of sample measurement includes excitation wavelength and fluorescence wavelength at the time of calculating model coefficients are within the measurement wavelength range and whether the input measurement conditions of sample measurement includes wavelength scanning rate, an excitation-side slit width, a fluorescence-side slit width, a response setting value, and a detector voltage that matches the measurement conditions being set in the condition setting step in the standard process.

Next, based on the conditions being set and under control of the controller 22, the measurement of the 3D fluorescence spectrum of the sample registered in the sample table is performed. The data processing unit 23 performs determination process of the candidate fluorescent substance using the 3D fluorescent spectrum measurement result of the sample and in accordance with the determination flow of the candidate fluorescence substance shown in FIGS. 3A-3D. As the measurement result, the information of the candidate fluorescent substance that is determined to have 3D fluorescent spectrum are displayed on the same screen of the monitor 31 as shown in FIG. 11.

Next, a description will be made of how the data processing unit 23 operates in extracting a candidate sample for an unknown measurement target in Embodiment 3.

The data processing unit 23 extracts a candidate fluorescent substance by collating, with the candidate fluorescent substance library, results obtained for a measured 3D fluorescence spectrum of an unknown measurement target sample whose determination information is not available, that is, an excitation wavelength and a fluorescence wavelength of a first peak selected at the peak selection step S11 of the fluorescent substance determining process shown in FIGS. 3A-3D, spectrum ranges that were set for respective contour determination values at the spectrum range selection step S12, and the number of sub peaks, sub peak ratios, sub peak excitation wavelengths, and sub peak fluorescence wavelengths that were obtained at the sub peak selection step S13.

Where plural first peaks are found, sets of a peak wavelength, spectrum ranges, and pieces of sub peak information are sequentially collated with the candidate fluorescent sample library, whereby candidate fluorescent substances that satisfy the above sets of pieces of peak information are extracted. A sample containing the extracted candidate fluorescent substances is extracted from the candidate fluorescent sample library, and the 3D fluorescence spectrum and the sample table of the measurement target sample and the extracted candidate sample are displayed on the monitor 31.

Next, an unknown sample determining program according to the present disclosure will be described. The unknown sample determining program according to the present disclosure is stored in the computer unit 200 of the unknown sample determining instrument (fluorescence spectrophotometer) according to the present disclosure, and is a program capable of executing the series of steps of Embodiment 2.

This program determines a fluorescent substance(s) and a sample by causing the photometer unit 100 to irradiate excitation light on a measurement target sample and measure a fluorescence spectrum according to an instruction from the controller 22, causing the data processing unit 23 to store a measurement result in three dimensions, that is, the excitation wavelength, the fluorescence wavelength, and the fluorescence intensity, and determining a fluorescence characteristic based on the stored data.

The program executes a standard process of causing the photometer unit 100 to perform measurements on standards whose determination information to become a target variable and a fluorescence characteristic such as density information are known in advance according to an instruction from the controller 22 and causing the data processing unit 23 to obtaining model coefficients for each pair of an excitation wavelength and a fluorescence wavelength by performing a multivariate analysis to determine an unknown sample, and a sample process of obtaining a target value of the unknown sample based on the model coefficients obtained by the standard process.

In the standard process, the program causes setting, through the operating panel 32, of conditions under which to measure a 3D fluorescence spectrum of each standard by the photometer unit 100 by sending an instruction from the controller 22 to it. Wavelength range conditions are set that include an excitation start wavelength, an excitation end wavelength, an excitation data interval, a fluorescence start wavelength, a fluorescence end wavelength, and a fluorescence data interval. A condition that dictates a measurement speed is a wavelength scanning rate. Conditions that dictate resolution are an excitation-side slit width and a fluorescence-side slit width. A condition relating to a data response speed is a response setting value that relates to noise and resolution. A condition that determines sensitivity is a detector voltage.

To perform a multivariate analysis, measurement data of plural standards are necessary. Thus, standards that are supposed to be subjected to measurement are registered in a standard table in advance. The program causes input, through the operating panel 32, of a sample name, information to become a target variable, and density information, and storage of them in the data processing unit 23.

Then the program causes the photometer unit 100 measure a 3D fluorescence spectrum of each standard according to an instruction from the controller 22. The program stores a resulting 3D fluorescence spectrum of the standard in the data processing unit 23 in the form of 3D data, that is, excitation wavelengths, fluorescence wavelengths, and fluorescence intensity values, and causes the data processing unit 23 to determine candidate fluorescent substances according to the candidate substance determining process using the stored 3D fluorescence spectrum. Candidate fluorescent substances are determined by collating the fluorescence characteristic of the stored 3D fluorescence spectrum with a candidate fluorescent substance library.

Then the program causes the monitor 31 to display together the 3D fluorescence spectrum and a result of determination of the candidate fluorescent substances extracted based on set peak wavelengths. As indicated by marks "o" in FIG. 10, the peak wavelengths of the candidate fluorescent substances are plotted in the 3D fluorescence spectrum so as to be recognizable. Sub peak wavelengths may also be plotted so as to be recognizable. Spectrum ranges corresponding to a contour line determination value "50" or "10" may also be displayed using a broken line or the like. Since the 3D fluorescence spectrum and the list of candidate fluorescent substances are displayed together, the candidate fluorescent substances for the respective peaks can be recognized visually. When one candidate fluorescent substance is selected, its peak wavelengths and spectrum range may be highlighted for determination.

The program sets spectrum ranges corresponding to a set contour line determination value and sets wavelengths to be used for a multivariate analysis using only data attributed to respective components and stores them in the data processing unit 23, whereby unnecessary data other than data of effective fluorescence regions can be eliminated.

Subsequently, at step S26, the program causes the data processing unit 23 to calculate model coefficients by performing a multivariate analysis such as a PLS regression analysis or a discriminant analysis using the data that have been set as a subject of the multivariate analysis. Since the model coefficients obtained here are basically ones obtained based on the data in the spectrum ranges, correlation is made between sets of model coefficients corresponding to respective pairs of wavelengths and candidate fluorescent substances involved.

In the sample process, at step S31, to determine a measurement result of a sample, the program causes the data processing unit 23 to read the model coefficients obtained at the multivariate analysis step S26. At step S32, the program sets sample measurement conditions by receiving them through the operating panel 32 or select sample measurement conditions stored in the data processing unit 23. Basically, the sample measurement conditions are set the same as the standard measurement conditions. However, to shorten the measurement time, the excitation start wavelength, the excitation end wavelength, the excitation data interval, the fluorescence start wavelength, the fluorescence end wavelength, the fluorescence data interval, etc. that relate to the measurement wavelength ranges may be changed according to the measurement wavelength ranges that were selected at step S25 of the standard process.

At step S33, it is determined whether the pairs of an excitation wavelength and a fluorescence wavelength corresponding to the sets of model coefficients that were read at step S31 are included in the respective pairs of measurement wavelength ranges, and whether the wavelength scanning rate, the excitation-side slit width, the fluorescence-side slit width, the response setting value, and the detector voltage are the same as those of the standard measurement conditions. Since the thus-set measurement conditions influence the resolution and sensitivity and hence fluorescence intensity values, the measurement conditions other than the excitation wavelength range and the fluorescence wavelength range should not be changed. The determination step S33 is executed to determine whether these sample measurement conditions are equivalent to the corresponding standard measurement conditions, to avoid measurement errors.

At step S34, a sample table is set by the operating panel 32 in advance for a sample to be subjected to measurement. In setting a sample table, a success/failure determination condition and determination value names may be determined.

At step S35, the program causes the photometer unit 100 to measure a 3D fluorescence spectrum of the sample according to the sample table that was set at step S34 and according to an instruction from the controller 31 that are based on the thus-set measurement conditions. At step S36, the program stores the measured 3D fluorescence spectrum in the data processing unit 23 in the form of 3D data, that is, excitation wavelengths, fluorescence wavelengths, and fluorescence intensity values, and determine candidate fluorescent substances according to the candidate fluorescent substance determining process shown in FIGS. 3A-3D. At step S37, the program causes the monitor 31 to display candidate fluorescent substance search results, that is, a 3D fluorescence spectrum and a result of determination of candidate fluorescent substances (see FIG. 10).

The program causes the monitor 31 to display a final measurement result of the entire process including the standard process and the sample process in the form of a picture shown in FIG. 11. Information of the standard table that was set in the standard process is displayed in a top-left part of the screen. Values of the calculation that was performed using the model coefficients that were read at step S31 and results of success/failure determinations made according to the success/failure determination condition that was set in the sample table at step S34 are displayed in a bottom-left part of the screen. A 3D fluorescence spectrum of an item selected from the standard information displayed in the top-left part or the sample information displayed in the bottom-left part is displayed in a top-right part of the screen.

Displayed in a bottom-right part of the screen is a list of candidate fluorescent substances, obtained at step S24, of the item selected from the standard information displayed in the top-left part or a list of candidate fluorescent substances, obtained at step S36, of the item selected from the sample information displayed in the bottom-left part. Also displayed is an average of the model coefficients, calculated by the multivariate analysis at step S26 in the standard process, of each candidate fluorescent substance. If a fluorescent substance other than the candidate fluorescent substances that were obtained in the standard process is obtained in the sample process, no average of model coefficients of that fluorescent substance is displayed.

In the 3D fluorescence spectrum displayed in the top-right part of the screen, the peak wavelengths and the sub peak wavelengths of the candidate fluorescent substances may be plotted so as to be recognizable, in the same manner as in the 3D fluorescence spectrum shown in FIG. 10. Spectrum ranges corresponding to contour line determination values "50" and "10" may further be displayed using a broken line or the like. Since the list of candidate fluorescent substances and the 3D fluorescence spectrum are displayed on the same screen, the candidate fluorescent substance for a peak of attention can be recognized visually. When one candidate fluorescent substance is selected, its peak wavelengths and spectrum range may be highlighted for determination.

In causing the data processing unit 23 to execute the candidate fluorescent substance determining process shown in FIGS. 3A-3D, at the peak selection step S11, the unknown sample determining program according to the invention causes selection of an excitation wavelength and a fluorescence wavelength of a first peak of attention in a measured 3D fluorescence spectrum in, for example, the manner shown in FIG. 4. The program causes the data processing unit 23 to identify fluorescent substances using the first peak and sub peaks appearing at the same fluorescence wavelength as the first peak does. The peak selection step S11 may be either such that a single peak is selected simply or such that an excitation wavelength range and a fluorescence wavelength range are set and an excitation wavelength and a fluorescence wavelength that provide a maximum intensity in these wavelength ranges are selected as peak wavelengths. An excitation wavelength range and a fluorescence wavelength range (e.g., ±5 nm) with respect to the peak wavelengths are also input through the operating panel 31 as search allowable ranges to be used in referring to a candidate fluorescent substance library. The program causes a determination as to whether the wavelength ranges of the first peak are within the input wavelength ranges. If the former are out of the latter, the program causes input of first peak wavelengths again.

Then the program causes the data processing unit 23 to normalize the peak intensity of the selected first peak selected by itself to a prescribed value to facilitate data comparison. In normalization processing, fluorescence intensity values in the entire wavelength ranges are multiplied by a normalization coefficient $C=F_n/F_0$ where $F_n$ is the normalized peak intensity and $F_0$ is the measured peak intensity. This processing makes it possible to compare peak intensity values of respective substances without causing distortion of spectrum shapes.

Where plural peaks exist at the same fluorescence wavelength EM as shown in areas (a) and (b) of FIG. 4, intensity values at respective excitation wavelengths are checked and a peak having a largest fluorescence intensity among them is employed as a first peak and used for normalization processing.

At the spectrum range selection step S12, the program causes the data processing unit 23 to select a spectrum range corresponding to a region enclosed by a broken line in area (a) of FIG. 5. A spectrum range is defined by an excitation wavelength range and a fluorescence wavelength range and is set for each contour line determination value, and information indicating it is stored in the data processing unit 23. The contour line determination value is a parameter that is specified by a measurer and indicates a threshold value for extraction of intensity data from a 3D fluorescence spectrum. For example, where the contour line determination value is set at "10," a spectrum range corresponding to an intensity "10" with respect to the normalized intensity "100" of the first peak that was set at the peak selection step S11 is searched for. And a target area is set that is defined by an excitation wavelength range and a fluorescence wavelength range. Widest wavelength ranges of a closed contour line that connects the same fluorescence intensity values are set. Then it is determined whether the thus-set spectrum range is included in measurement wavelength ranges. If the spectrum range is out of the measurement wavelength ranges, another spectrum range is set.

Where peaks of two fluorescent substances are located close to each other as shown in area (a) of FIG. 6, the program causes the data processing unit 23 to perform proximate peaks determination processing.

At the sub peak setting step S13, the program causes the data processing unit 23 to set sub peak wavelengths as shown in area (a) of FIG. 7 (a range enclosed by a broken line) and areas (b) and (c) of FIG. 7. Sub peaks may be set either automatically by setting an intensity threshold value and extracting peaks that exceed the threshold value or manually by an operator.

As shown in FIGS. 3A-3D, the program causes the data processing unit 23 to extract a candidate fluorescent substance through collation with the candidate fluorescent substance library that is prepared in advance. The candidate fluorescent substance library is a library of fluorescent substances produced by performing, in advance, measurements on fluorescent substances to become candidates, and contains, for each fluorescent substance, a peak excitation wavelength range and a peak fluorescence wavelength range that were obtained at the peak selection step S11, spectrum ranges that were set for respective contour line determination values at the spectrum range selection step S12, and the number of sub peaks, sub peak ratios, sub peak excitation wavelengths EX, and sub peak fluorescence wavelengths EM that were obtained at the sub peak selection step S13. Measurement data are compared with the candidate fluorescent substance library in each process, whereby a candidate fluorescent substance is determined from the fluorescent substances contained in the candidate fluorescent substance library.

As shown in FIG. 13A, the program causes the monitor 31 to display results obtained at the peak selection step S11, the spectrum range selection step S12, and the sub peak selection step S13 of each process in the form of a list. More specifically, the list contains peak wavelengths of a first peak that was specified at the peak selection step S11, a spectrum range (spectrum range-50) corresponding to a contour line determination value "50" and a spectrum range (spectrum range-10) corresponding to a contour line determination value "10" that were obtained at the spectrum range selection step S12, and sub peak information that was obtained at the sub peak selection step S13, that is, the number of sub peaks, sub peak ratios, sub peak excitation wavelengths EX, and sub peak fluorescence wavelengths EM. As shown in FIG. 13B, the program causes the monitor 31 to display a result of determination, from the candidate fluorescent substance library, of a candidate fluorescent substance that satisfies the above conditions in the form of a candidate fluorescent substance list.

Where the same sample exhibits plural peaks corresponding to plural respective fluorescent substances, after determination of a candidate fluorescent substance for one fluorescent substance, the program causes the data processing unit 23 to select another first peak at the peak selection step S11 and determine a candidate fluorescent substance corresponding to peaks selected at the spectrum range selection step S12 and the sub peak selection step S13. Fluorescent substances are thus identified sequentially.

It is appropriate to display results of determination of candidate fluorescent substances corresponding to the respective first peaks together with their names. It is also appropriate to also show, for each candidate fluorescent substance, pieces of information that were used for the determination, that is, peak wavelengths, a spectrum range corresponding to a contour line determination value "50," a spectrum range corresponding to a contour line determination value "10", the number of sub peaks, sub peak ratios, sub peak excitation wavelengths EX, and sub peak fluorescence wavelengths EM.

As described above, fluorescent substances are identified using fluorescence characteristics of 3D fluorescence spectra of standards measured in the standard process. In contrast, in the case of an unknown measurement target sample whose classification/family information etc. (determination information) such as whether it is an organic material or an inorganic material or whether it is a food or a medicine are not available, the sample is identified by executing the candidate fluorescent substance determining process shown in FIGS. 3A-3D.

In the case of an unknown sample whose determination information is not available, the sample process is executed without executing the standard process (see FIG. 9). Sample measurement conditions are set at step S32, a sample table is set at step S34 by inputting pieces of sample information, and a 3D fluorescence spectrum of the sample is measured at step S35 according to the conditions that were set at step S32. The candidate fluorescent substance determining process shown in FIGS. 3A-3D, which includes the peak selection step S11, the spectrum range selection step S12, and the sub peak selection step S13, is performed on the 3D fluorescence spectrum obtained, whereby pieces of fluorescence characteristic information are obtained. Candidate fluorescent substances are determined by collating obtained peak wavelengths, spectrum ranges, and pieces of sub peak information with the candidate fluorescent substance library. A sample containing the thus-determined candidate fluorescent substances is extracted from the candidate fluorescent sample library.

A measurement target sample such as a food, a chemical material, or an environmental substance in many cases contains plural fluorescent substances and plural kinds of fluorescence characteristics may be obtained from a 3D fluorescence spectrum. Where plural kinds of fluorescence characteristics are obtained from a 3D fluorescence spectrum, as shown in FIG. 12, determination of candidate fluorescent substances of an unknown sample and extraction of a candidate sample that were described above are performed repeatedly and candidate samples are thereby narrowed down. A candidate sample that exhibits an effective fluorescence characteristic is extracted finally from the candidate fluorescent substance library.

As described with reference to the embodiments, there are provided the unknown sample determining method, the unknown sample determining instrument, and the unknown sample determining program that, in analysis techniques of performing a multivariate analysis on 3D fluorescence spectrum data, are capable to identify fluorescent substances corresponding to peaks of a 3D fluorescence spectrum of a sample and display their list and can also be applied to identification and same/different determination of the sample itself that are made based on identification results of fluorescent substances corresponding to plural respective peaks. The use of these method, instrument, and program can also provide advantages of increase of the accuracy of a multivariate analysis and shortening of its execution time.

What is claimed is:
1. An unknown sample determining method of determining an unknown sample by calculating model coefficients by extracting a fluorescence characteristic from results of measurements of 3D fluorescence spectra of standards, the method comprising:

a standard process of performing measurements on standards, including:
  setting measurement conditions under which to measure 3D fluorescence spectra of the standards;
  registering, in a standard table, the standards in a form of combinations of at least a sample name, determination information, and density information;
  measuring 3D fluorescence spectra of the standards registered in the standard table under the set measurement conditions;
  determining candidate fluorescent substances contained in each of the standards by extracting a fluorescence characteristic from 3D fluorescence spectrum of the standard and comparing the extracted fluorescence characteristic with fluorescence characteristics registered in a candidate fluorescent substance library;
  extracting first peaks representing parts of the fluorescence characteristic from the 3D fluorescence spectrum of each of the standards obtained in the measuring 3D fluorescence spectra, and normalizing the first peaks;
  setting spectrum ranges corresponding to a fluorescence intensity contour line determination value to obtain set spectrum ranges;
  selecting sub peaks in each of the set spectrum ranges to obtain selected sub peaks; and
  determining model coefficients by performing a multivariate analysis based on the extracted first peaks, the set spectrum ranges, and the selected sub peaks; and
a sample process of performing a measurement on an unknown sample, including:
  reading the determined model coefficients;
  setting measurement conditions to measure a 3D fluorescence spectrum of the unknown sample;
  determining whether the set measurement conditions are equivalent to the set measurement conditions of the standard process or include a spectrum range of a fluorescence characteristic;
  setting, as a sample table, a sample name of the unknown sample and a determination condition;
  performing a measurement on the unknown sample under the set measurement conditions;
  determining candidate fluorescent substances that match the determined model coefficients read based on a fluorescence characteristic of a 3D fluorescence spectrum obtained by the performing the measurement on the unknown sample;
  extracting a candidate sample by collating a combination of the candidate fluorescent substances determined at the determining candidate fluorescent substances with a candidate sample library;
  displaying a list of names of the collated candidate fluorescent substances and the fluorescence characteristic used for the determination of the candidate fluorescent substances; and
  displaying a name of the extracted candidate sample together with fluorescence characteristics of the respective candidate fluorescent substances.

2. The unknown sample determining method according to claim 1,
  wherein the candidate fluorescent substance determining of each of the standard process and the sample process includes:
    selecting first peaks each of which representing a local maximum fluorescence intensity of the 3D fluorescence spectrum measured in the measure 3D fluorescence spectra of the standard process or the sample process or represents a dominant fluorescence characteristic in a specified spectrum range of the measured 3D fluorescence spectrum, normalizing the first peaks, and setting an allowable wavelength range of the first peaks;
    performing a proximate peaks determination process so that plural ones of set spectrum ranges do not overlap with each other that are set by setting spectrum ranges each of which is defined by an excitation wavelength range and a fluorescence wavelength range and corresponds to a contour line determination value and excluding spectrum ranges of scattered light and high-order light that are unnecessary for fluorescence characteristic determination; and
    setting at least a number, peak wavelengths, and peak intensity ratios to a first peak of sub peaks in each of the spectrum ranges corresponding to the contour line determination value,
  wherein the determining candidate fluorescent substances in the standard process includes determining whether the selected first peaks, the set spectrum ranges, and the selected sub peaks coincide with corresponding pieces of information of candidate fluorescent substances registered in the candidate fluorescent substance library,
  wherein the determining candidate fluorescent substances in the sample process includes determining whether the selected first peaks, the set spectrum ranges, and the selected sub peaks coincide with corresponding pieces of information of the candidate fluorescent substances determined in the standard process, and
  wherein the determining candidate fluorescent substances in each of the standard process and the sample process further includes:
    displaying a list of names of the candidate fluorescent substances that matched the determined model coefficients, the selected first peaks, the set spectrum ranges, and the selected sub peaks.

3. The unknown sample determining method according to claim 1, wherein the setting spectrum ranges includes a proximate peaks determination processing which is performed when first peaks attributed to plural respective fluorescent substances are so close to each other that spectrum ranges corresponding to the contour line determination value overlap with each other, the proximate peaks determination processing including:
  selecting fluorescence wavelength ranges so that fluorescence intensity contour lines do not overlap with each other; and
  setting excitation wavelength ranges based on the selected fluorescence wavelength ranges to prevent fluorescence characteristics of plural fluorescent substances from interfering with each other.

4. The unknown sample determining method according to claim 1, wherein the extracting the candidate sample includes:
  identifying plural combination of fluorescent substances, when plural combination of fluorescent substances are determined in the determining candidate fluorescent substances of the sample process, by repeatedly extracting, a number of times that is equal to a number of combinations of fluorescent substances, a combination of candidate fluorescent substances in the extracting the first peaks, the setting the spectrum ranges, and the selecting sub peaks; and extracting a candidate sample by collating the identified plural combinations of fluorescent substances with the candidate sample library.

5. The unknown sample determining method according to claim 1, wherein the displaying the list of names includes displaying a list of the names of the collated candidate fluorescent substances and at least pairs of wavelengths of the first peaks, the spectrum ranges, and sets of sub peak information based on which the fluorescence characteristic was determined and the model coefficients.

6. The unknown sample determining method according to claim 1, wherein the displaying the name of the extracted candidate sample together with fluorescence characteristics of the respective candidate fluorescent substances includes selectively displaying, together with the names of the collated candidate fluorescent substances:
a first area in which the registered standard table is displayed;
a second area in which a list of the names of the collated candidate fluorescent substances and at least pairs of wavelengths of the first peaks, the spectrum ranges, and sets of sub peak information based on which the fluorescence characteristic was determined and the model coefficients are displayed; and
a third area in which a selected one of the 3D fluorescence spectra that is marked is displayed so that a corresponding one of the fluorescent substances in the list and its first peak are recognizable.

7. An unknown sample determining instrument comprising a photometer unit, a computer unit, and an interface unit, wherein the photometer unit performs operations comprising:
measuring a 3D fluorescence spectrum in a form of a fluorescence intensity contour diagram by measuring a fluorescence spectrum by shining excitation light emitted from an excitation-side spectroscope set at a fixed wavelength on a measurement sample while wavelength-scanning a fluorescence-side spectroscope;
returning a fluorescence wavelength of the excitation-side spectroscope to a start wavelength upon completion of the measurement of the fluorescence spectrum;
measuring a fluorescence spectrum at a next excitation wavelength by changing an excitation wavelength by a prescribed interval;
storing measured fluorescence spectra in three dimensions of the excitation wavelength, the fluorescence wavelength, and the fluorescence intensity; and
performing the preceding operations until the excitation wavelength reaches a final wavelength,
wherein the computer unit controls the photometer unit,
wherein the interface unit includes a monitor and an operating panel,
wherein the computer unit executes a standard process of performing measurements on standards and a sample process of performing a measurement on an unknown sample,
in the standard process, the computer unit
measures 3D fluorescence spectra of the standards registered in a standard table according to set standard measurement conditions; and
performs a candidate fluorescent substance determining process of determining candidate fluorescent substances based on a fluorescence characteristic of each of the measured 3D fluorescence spectra, the candidate fluorescent substance determining process including:
setting, in the 3D fluorescence spectrum in which measured fluorescence intensity values are expressed by contour lines, first peaks having large fluorescence intensity values, spectrum ranges corresponding to a contour line determination value, and sets of sub peaks located at fluorescence wavelengths the same as the first peaks, respectively;
excluding data that are out of the set spectrum ranges from 3D fluorescence spectrum data to be subjected to a multivariate analysis and employing only data in the set spectrum ranges as the 3D fluorescence spectrum data to be subjected to the multivariate analysis; and
calculating model coefficients by performing the multivariate analysis and storing the calculated model coefficients; and
in the sample process, the computer unit
reads the model coefficients;
determines that spectrum ranges used in calculating the model coefficients are included in spectrum ranges of input unknown sample measurement conditions;
determines that at least a wavelength scanning rate, an excitation-side slit width, a fluorescence-side slit width, a response setting value, and a detector voltage of the input unknown sample measurement conditions are the same as those of the standard measurement conditions; and
performs a candidate fluorescent substance determining process of determining candidate fluorescent substances of the unknown sample registered in a sample table using a measured 3D fluorescence spectrum of the unknown sample, the candidate fluorescent substance determining process including:
setting first peaks, spectrum ranges, and sets of sub peaks in the 3D fluorescence spectrum in which measured fluorescence intensity values are expressed by contour lines;
performing determination processing based on the read model coefficients; and
displaying candidate fluorescent substances and a candidate sample extracted by the determination processing in such a manner that a name of the candidate sample and fluorescence characteristic information including the first peaks, the spectrum ranges, and sets of pieces of sub peak information, and a 3D fluorescence spectrum in which at least the first peaks and the spectrum ranges are indicated are displayed on the same screen of the monitor so as to enable recognition of determination results.

8. A non-transitory computer-readable medium storing an unknown sample determining program that, when executed by a computer unit, causes a photometer unit to measure a 3D fluorescence spectrum by shining excitation light on a measurement sample, stores, in memory, the measured 3D fluorescence spectrum in three dimensions of an excitation wavelength, a fluorescence wavelength, and a fluorescence intensity, and executes a candidate fluorescence substance determining process based on the stored measured 3D fluorescence spectrum to determine candidate fluorescent substances and a candidate sample, wherein the unknown sample determining program, when executed by the computer unit, further performs a series of processes including:

executing a standard process of performing measurements on standards whose determination information to become a target variable and a fluorescence characteristic including density information are predetermined, and calculating model coefficients for each pair of the excitation wavelength and the fluorescence wavelength by performing a multivariate analysis on 3D fluorescence spectra; and executing a sample process of identifying an unknown sample or obtaining a target value including success or failure or a density based on the model coefficients calculated by the standard process.

9. The non-transitory computer-readable medium according to claim 8, wherein, in the standard process, the unknown sample determining program performs a series of processes including:

setting measurement conditions for performing measurements on standards to determine candidate fluorescent substances of each of the standards;

registering plural pieces of standard information of the standards in the memory in a form of a standard table;

storing measured 3D fluorescence spectra in the memory;

extracting a fluorescence characteristic including pairs of peak wavelengths, spectrum ranges, and sets of sub peaks from each of the stored 3D fluorescence spectra;

selecting excitation wavelength ranges and fluorescence wavelength ranges for fluorescence characteristic determination; and calculating model coefficients by performing a multivariate analysis; and wherein, in the sample process, the unknown sample determining program performs a series of processes including:

reading the model coefficients calculated in the standard process;

setting measurement conditions under which to perform a measurement on the unknown sample;

registering plural pieces of sample information to be measured in the memory in the form of a sample table;

storing a measured 3D fluorescence spectrum in the memory;

extracting a fluorescence characteristic including pairs of peak wavelengths, spectrum ranges, and sets of sub peaks from the stored 3D fluorescence spectrum;

determining candidate fluorescent substances based on the read model coefficients; and displaying on a display the 3D fluorescence spectrum of the unknown sample and a fluorescence characteristic relating to the determination of the candidate fluorescent substances.

10. The non-transitory computer-readable medium according to claim 8, wherein, in the candidate fluorescence substance determining process, the unknown sample determining program performs a series of processes including:

executing a peak selection step by
selecting peaks of attention as first peaks from the measured and stored 3D fluorescence spectrum;

determining candidate fluorescent substances using the selected first peaks and sets of sub peaks appearing at fluorescence wavelengths the same as the first peaks, respectively;

setting an excitation wavelength allowable range and a fluorescence wavelength allowable range;

determining whether a set excitation wavelength range and a fluorescence wavelength range are included in wavelength ranges for 3D fluorescence spectrum measurement that was set at a time of setting of measurement conditions;

setting the excitation wavelength range and the fluorescence wavelength range again if a determination result is negative;

normalizing peak intensity values of the first peaks to facilitate data comparison, and calculating normalization coefficients; and multiplying fluorescence intensity values at all pairs of wavelengths by the corresponding normalization coefficients;

executing a spectrum range selection step by
setting spectrum ranges for respective contour line determination values;

determining whether the set spectrum ranges are included in the wavelength ranges for 3D fluorescence spectrum measurement that was set at the time of setting of the measurement conditions;

setting spectrum ranges again if a determination result is negative;

setting determination wavelength ranges; and if there are first peaks that are close to each other, performing proximate peaks determination processing of setting spectrum ranges so that fluorescent intensity contour lines of the first peaks do not overlap with each other;

executing a sub peak selection step by
setting, as sets of sub peaks, sets of peaks other than the first peaks in the spectrum ranges that were set at the spectrum range selection step; and determining sets of pieces of sub peak information each of which includes a number of sub peaks, sub peak ratios, and sub peak wavelengths; and determining candidate fluorescent substances by collating the sub peaks set at the peak selection step, the spectrum range selection step, and the sub peak selection step with a candidate fluorescent substance library.

11. The non-transitory computer-readable medium according to claim 8, wherein, in identifying the unknown sample in the sample process, the unknown sample determining program executes the candidate fluorescent substance determining process by determining candidate fluorescent substances;

extracting a candidate sample containing the determined candidate fluorescent substances from a candidate fluorescent sample library; and if plural combinations of fluorescent substances are found, extracting a candidate sample containing a second-determined combination of fluorescent substances from the candidate fluorescent sample library;

executing the extracting repeatedly a number of times that is equal to a number of combinations of fluorescent substances to narrow down the candidate samples; and displaying a name of a finally extracted candidate sample and its fluorescence characteristic information together with a measured 3D fluorescence spectrum.

* * * * *